July 3, 1945.  T. O. MEHAN ET AL  2,379,449
MULTIPLYING MACHINE
Filed July 31, 1941   15 Sheets-Sheet 1

Inventors:
Thomas O. Mehan
Hunter E. Hose
By Williams, Bradbury & Hinkle
Attys.

July 3, 1945.　　　T. O. MEHAN ET AL　　　2,379,449
MULTIPLYING MACHINE
Filed July 31, 1941　　　15 Sheets-Sheet 9

Inventors:
Thomas O. Mehan
Hunter E. Hooe
By Williams, Bradbury & Hinkle
Attys.

July 3, 1945.  T. O. MEHAN ET AL  2,379,449
MULTIPLYING MACHINE
Filed July 31, 1941   15 Sheets-Sheet 10

Inventors:
Thomas O. Mehan
Hunter E. Hooe
By William, Bradbury & Hinkle
Attys.

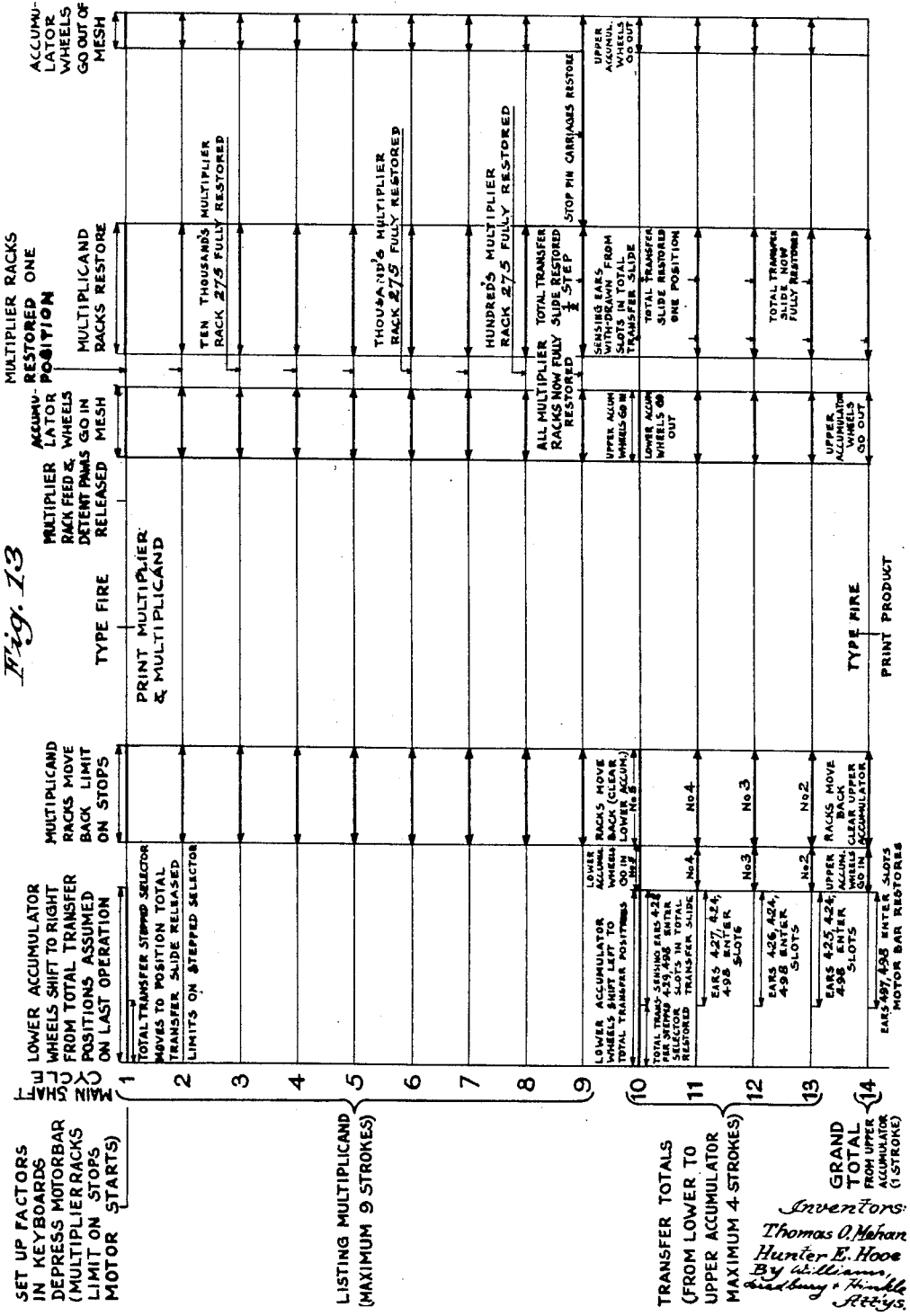

July 3, 1945.   T. O. MEHAN ET AL   2,379,449
MULTIPLYING MACHINE
Filed July 31, 1941   15 Sheets-Sheet 12

95147 × 36809 = 3502265923

| | LOWER (L5) ACCUMULATOR (TEN THOUSANDS) 6 WHEELS (ADD 3 TIMES) | LOWER (L4) ACCUMULATOR (THOUSANDS) 6 WHEELS (ADD 6 TIMES) | LOWER (L3) ACCUMULATOR (HUNDREDS) 6 WHEELS (ADD 8 TIMES) | LOWER (L2) ACCUMULATOR (TENS) 6 WHEELS (ADD 0 TIMES) | CYCLE | (U-1) UPPER ACCUMULATOR (UNITS) 10 WHEELS (ADD 9 TIMES) |
|---|---|---|---|---|---|---|
| LISTING MULTIPLICAND (MAXIMUM 9 STROKES) | 95147 | 95147 | 95147 | NON ADD | (1) | 95147 |
| | 95147 | 95147 | 95147 | NON ADD | (2) | 95147 |
| | 95147 | 95147 | 95147 | NON ADD | (3) | 95147 |
| | NON ADD | 95147 | 95147 | NON ADD | (4) | 95147 |
| | NON ADD | 95147 | 95147 | NON ADD | (5) | 95147 |
| | NON ADD | 95147 | 95147 | NON ADD | (6) | 95147 |
| | NON ADD | NON ADD | 95147 | NON ADD | (7) | 95147 |
| | NON ADD | NON ADD | 95147 | NON ADD | (8) | 95147 |
| | NON ADD | NON ADD | NON ADD | NON ADD | (9) | 95147 |
| LOWER WHEELS | 285441 | 570882 | 761176 | 000000 | | 856323 |
| SHIFT AND TRANSFER TOTALS TO UPPER ACCUMULATOR (MAXIMUM 4 STROKES) | | | | | (10) | →285441 |
| | | | | | (11) | →570882 |
| | | | | | (12) | →761176 |
| | | | | | (13) | →000000 |
| GRAND TOTAL FROM UPPER ACCUMULATOR (1 STROKE) | | | | | (14) | 3,502,265,923 |

Fig. 14

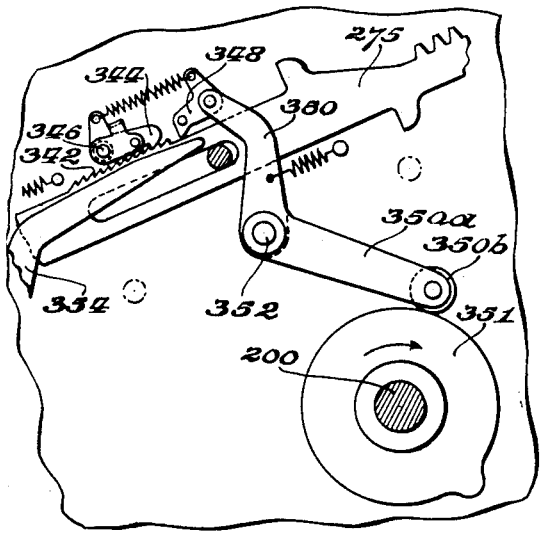

Fig. 21

Inventors:
Thomas O. Mehan
Hunter E. Hooe
By Williams, Bradbury & Hinkle
Attys.

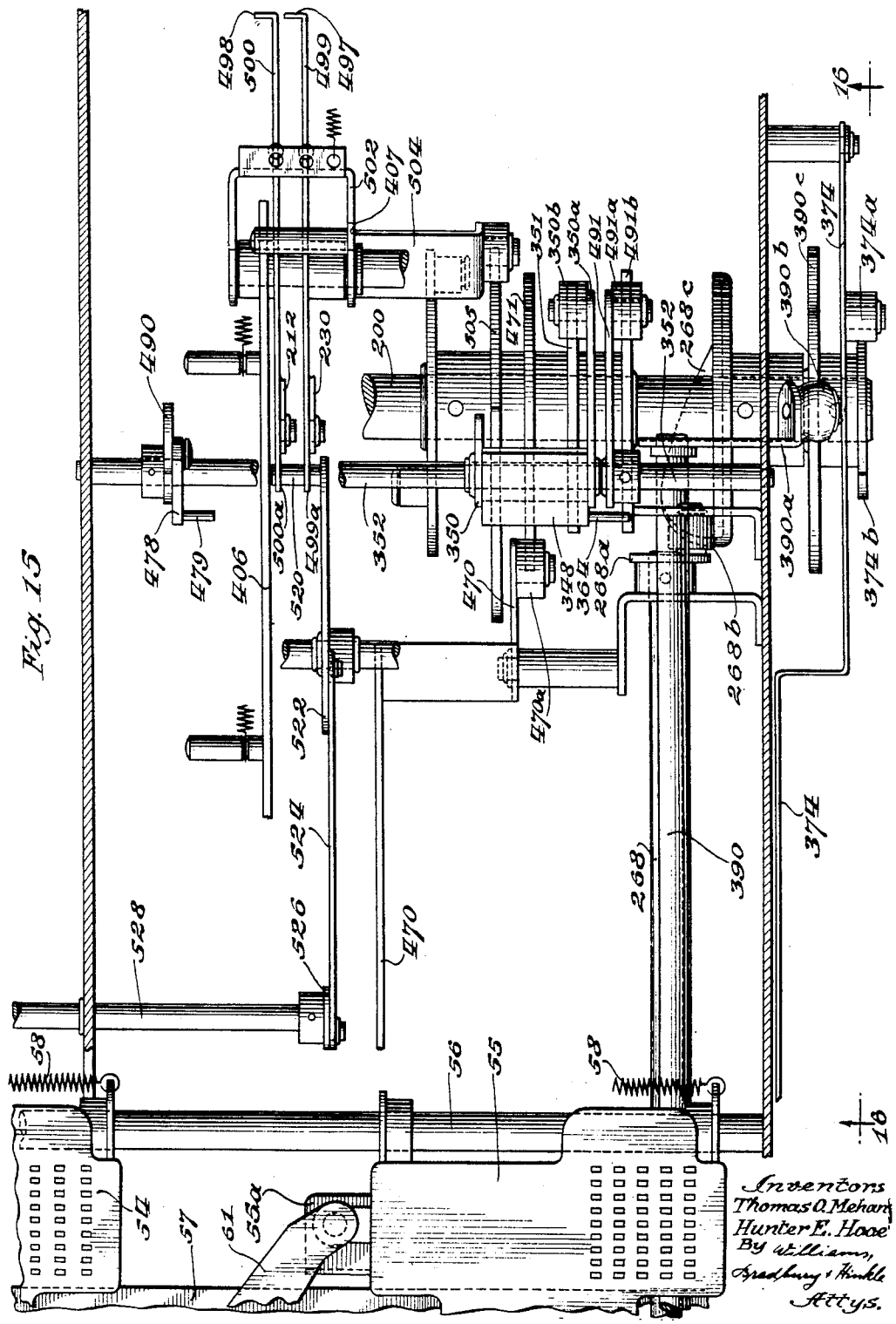

July 3, 1945. T. O. MEHAN ET AL 2,379,449
MULTIPLYING MACHINE
Filed July 31, 1941 15 Sheets-Sheet 14
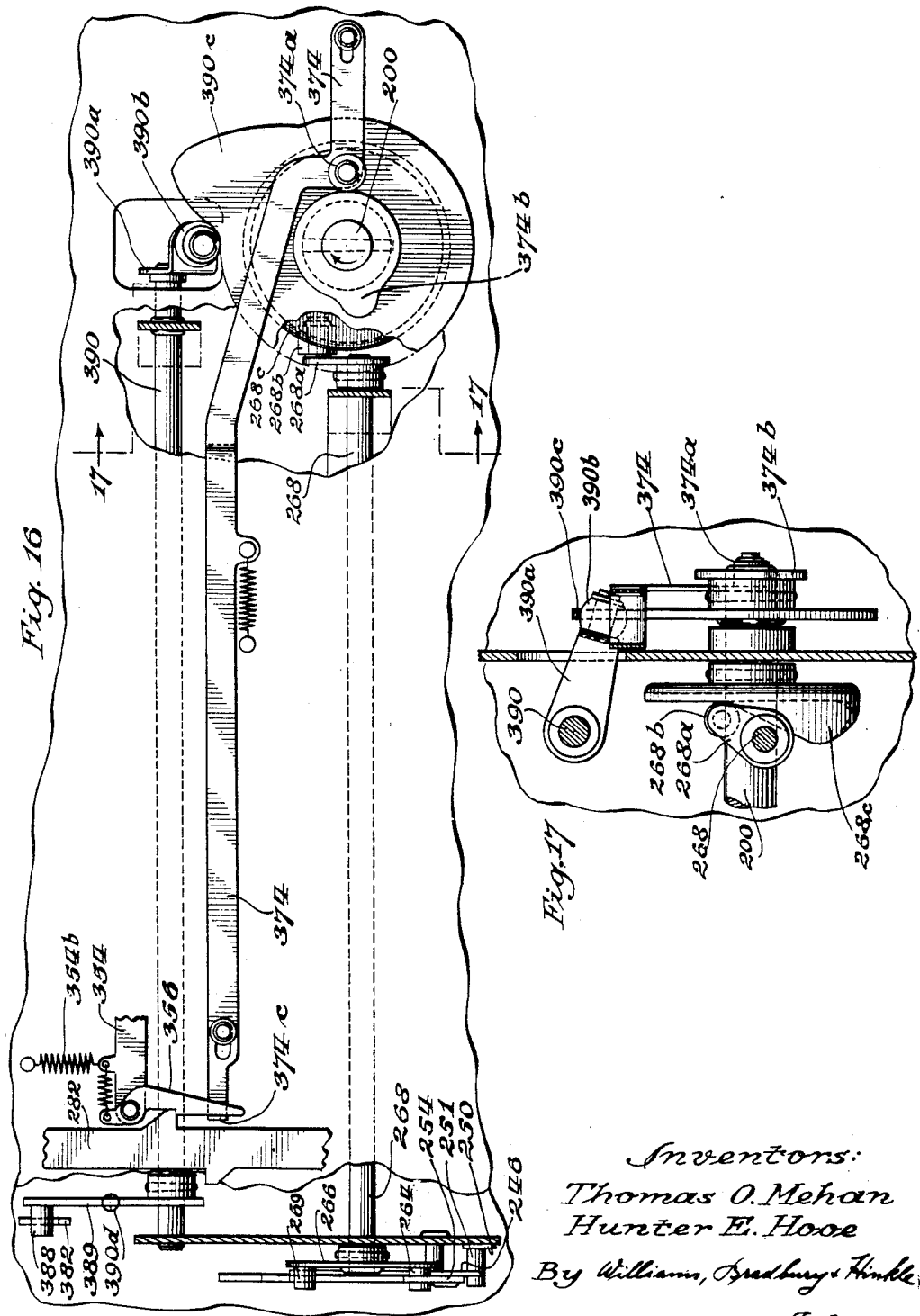
Inventors:
Thomas O. Mehan
Hunter E. Hooe
By Williams, Bradbury & Hinkle
Attys.

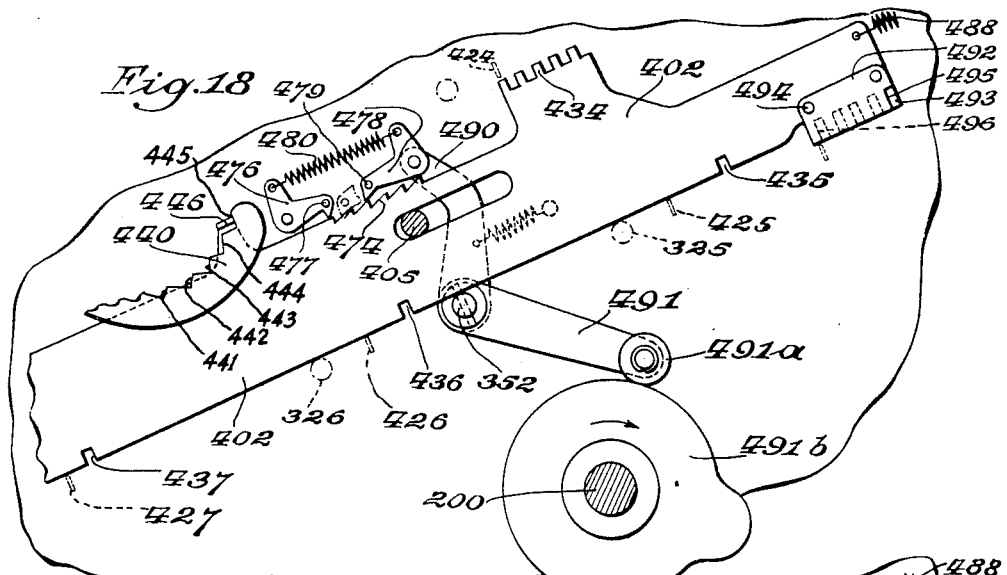
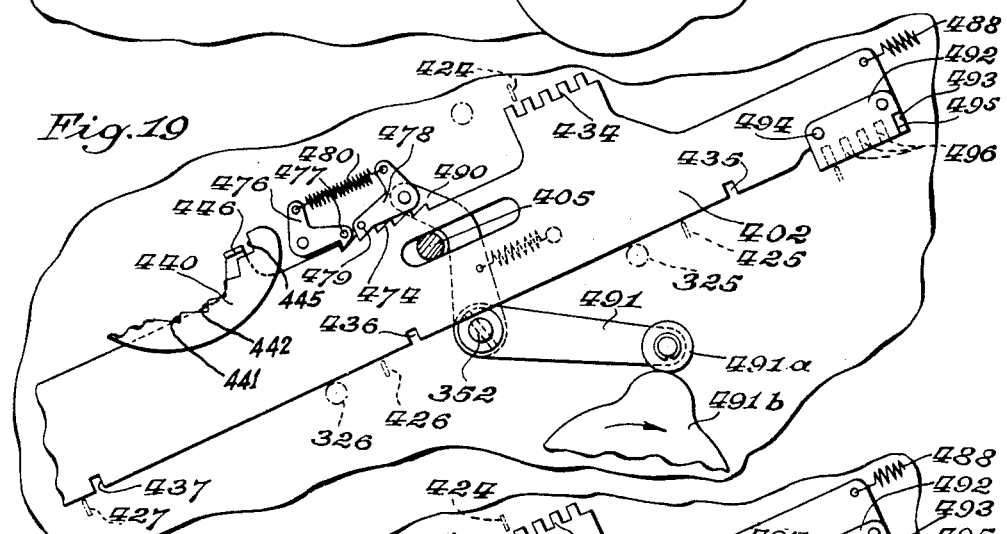
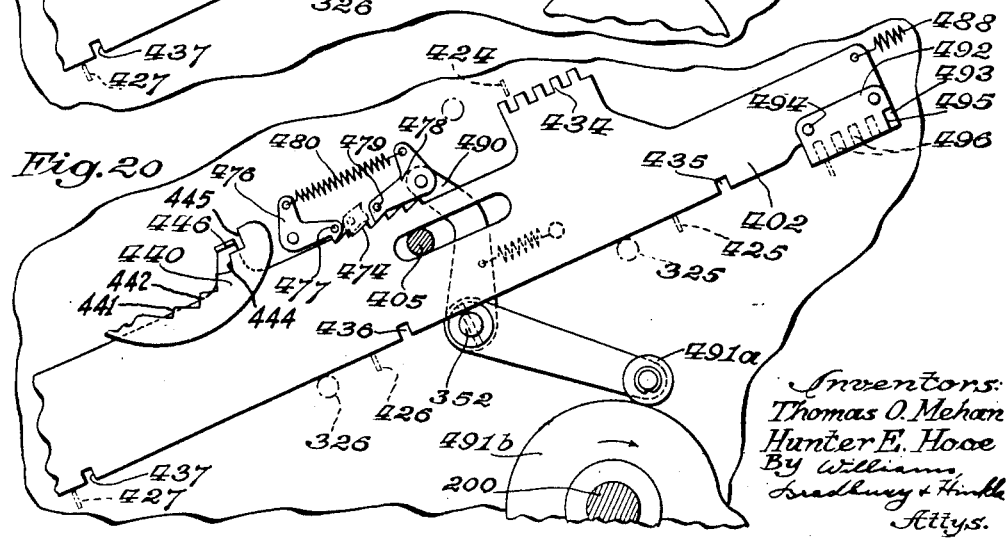

Patented July 3, 1945

2,379,449

UNITED STATES PATENT OFFICE 2,379,449

MULTIPLYING MACHINE

Thomas O. Mehan, Park Ridge, and Hunter E. Hooe, Chicago, Ill., assignors to Victor Adding Machine Co., Chicago, Ill., a corporation of Illinois Application July 31, 1941, Serial No. 404,934

20 Claims. (Cl. 235—61)

Our invention relates generally to calculating machines, and more particularly to multiplying machines.

It is thus an object of our invention to provide an improved machine devised particularly for the performance of multiplying operations, whereby the time required for performing such operations is considerably less than that required for the performance of such operations upon machines of the prior art, in which multiplication is effected by repeated addition.

A further object is to provide an improved multiplying machine which is very simple in operation, which will make a record of the multiplier, multiplicand, and product, which is simple in construction, and which may be economically manufactured.

A further object is to provide an improved calculating machine in which a multiplicand may be simultaneously entered upon a plurality of accumulators, each representative of one denominational order of the multiplier, and in which the multiplicand is simultaneously entered on all of such accumulators the number of times required by the digits forming the multiplier, and in which the accumulations of said denominational accumulators are automatically transferred to a master accumulator, provision being made to shift said accumulators relative to the means for entering their accumulations into said master accumulator so that each accumulator will enter its accumulation in the proper denominational order of the master accumulator.

Other objects will appear from the following description, reference being had to the accompanying drawings, in which.

Figure 2:
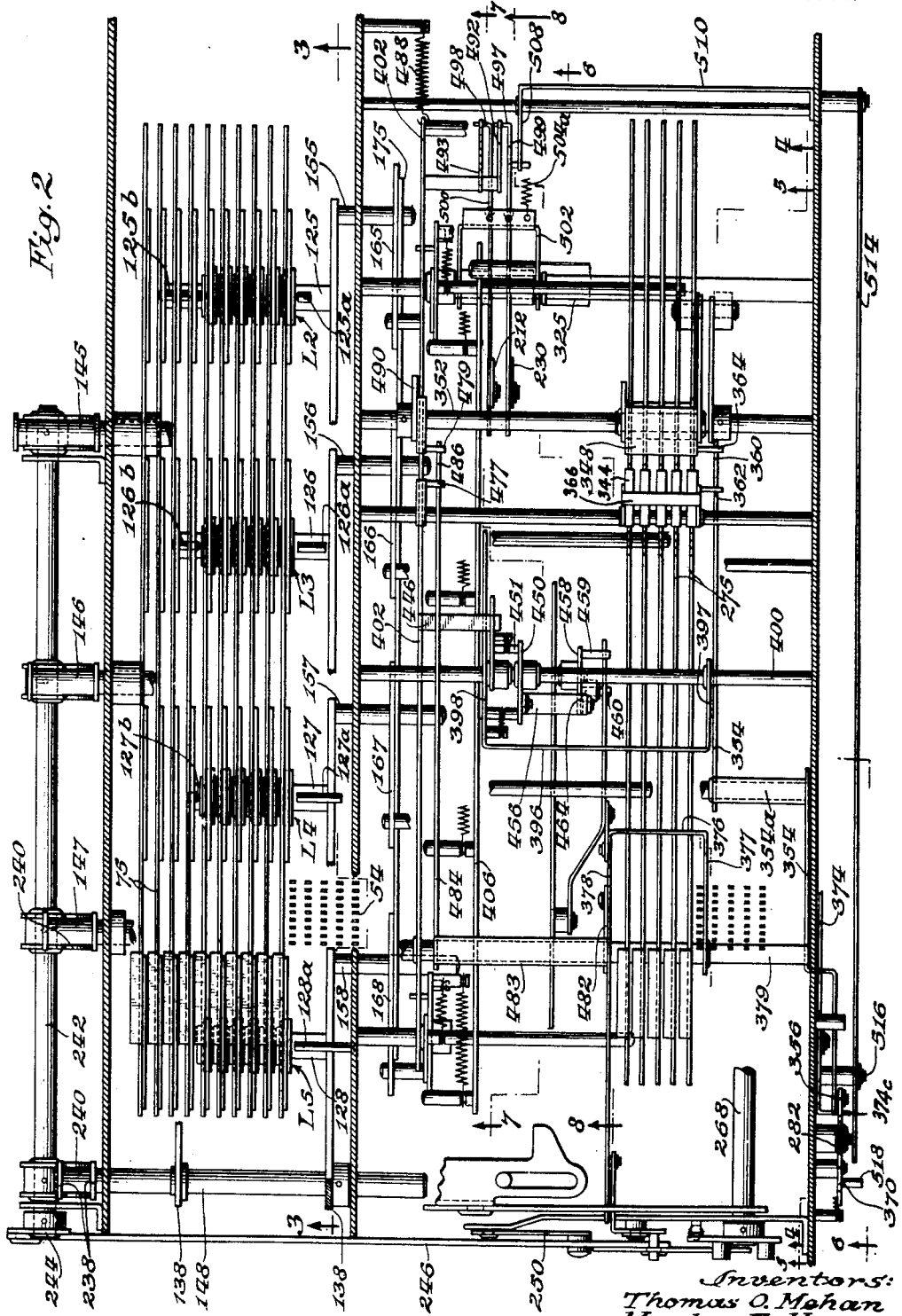
Fig. 2 is a substantially horizontal sectional view of the main portion of the machine.
Figure 4:
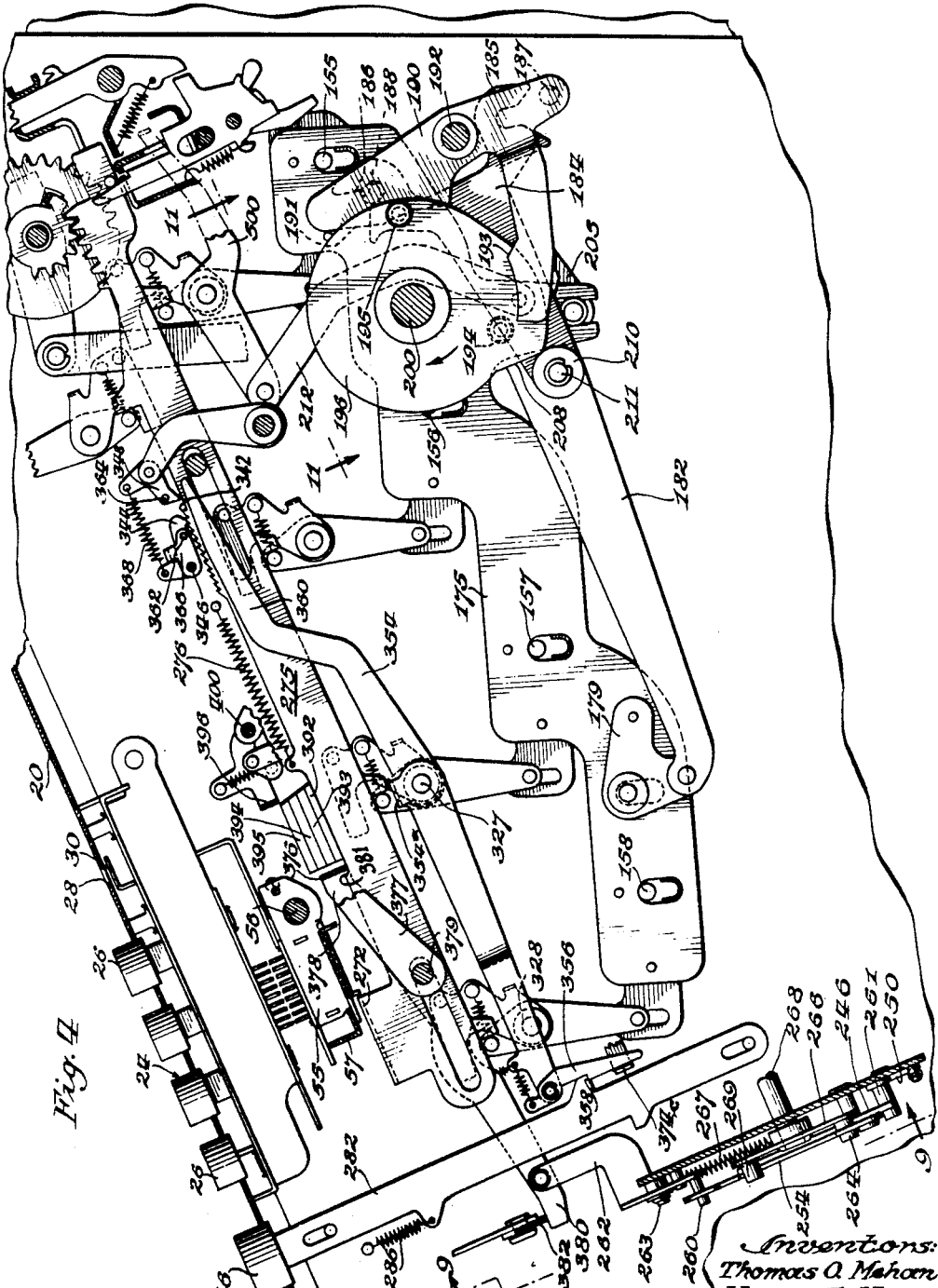
Figure 9:
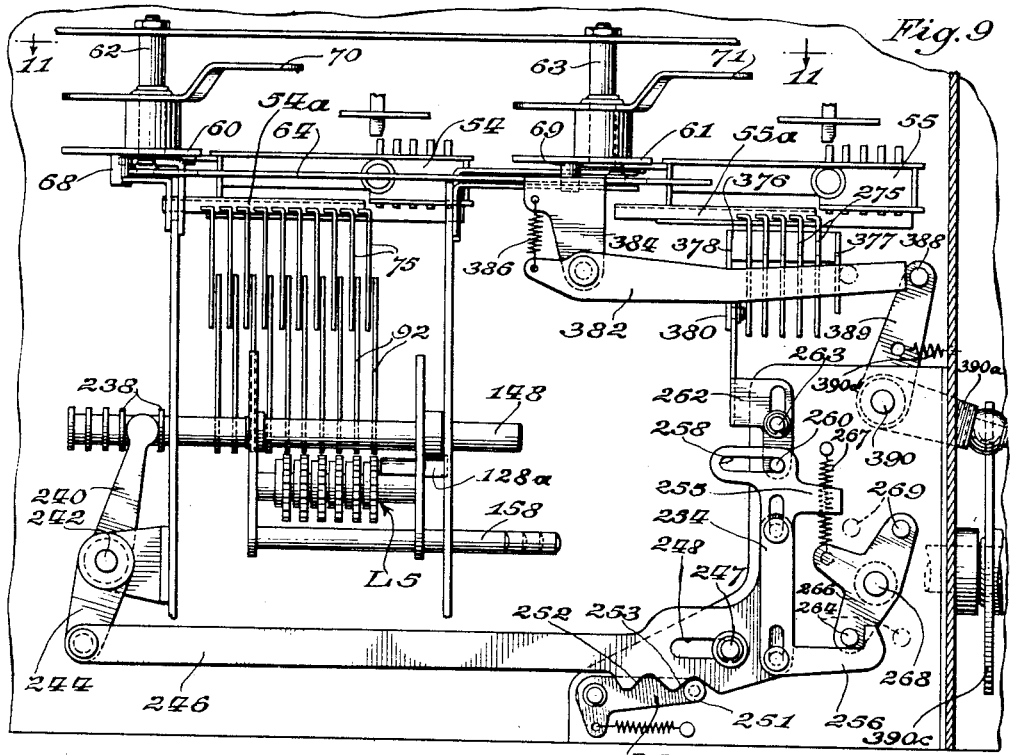
Figure 10:
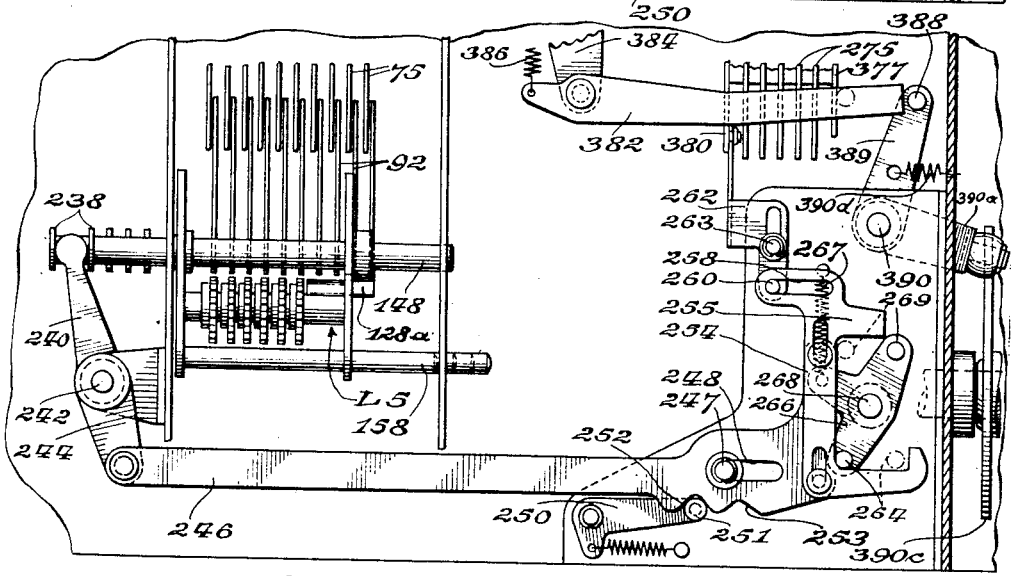
Figure 11:
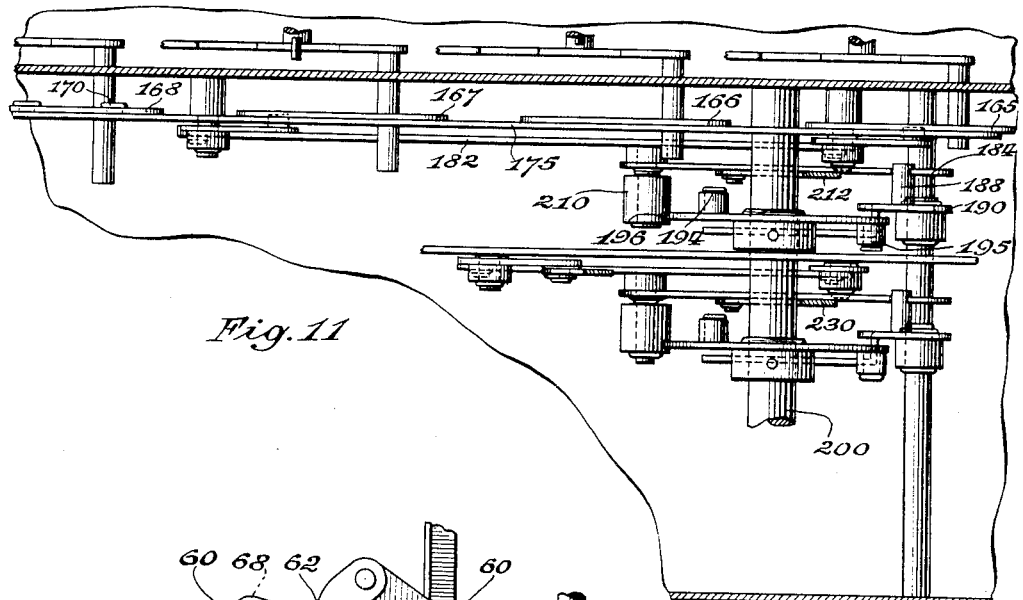
Figure 12:
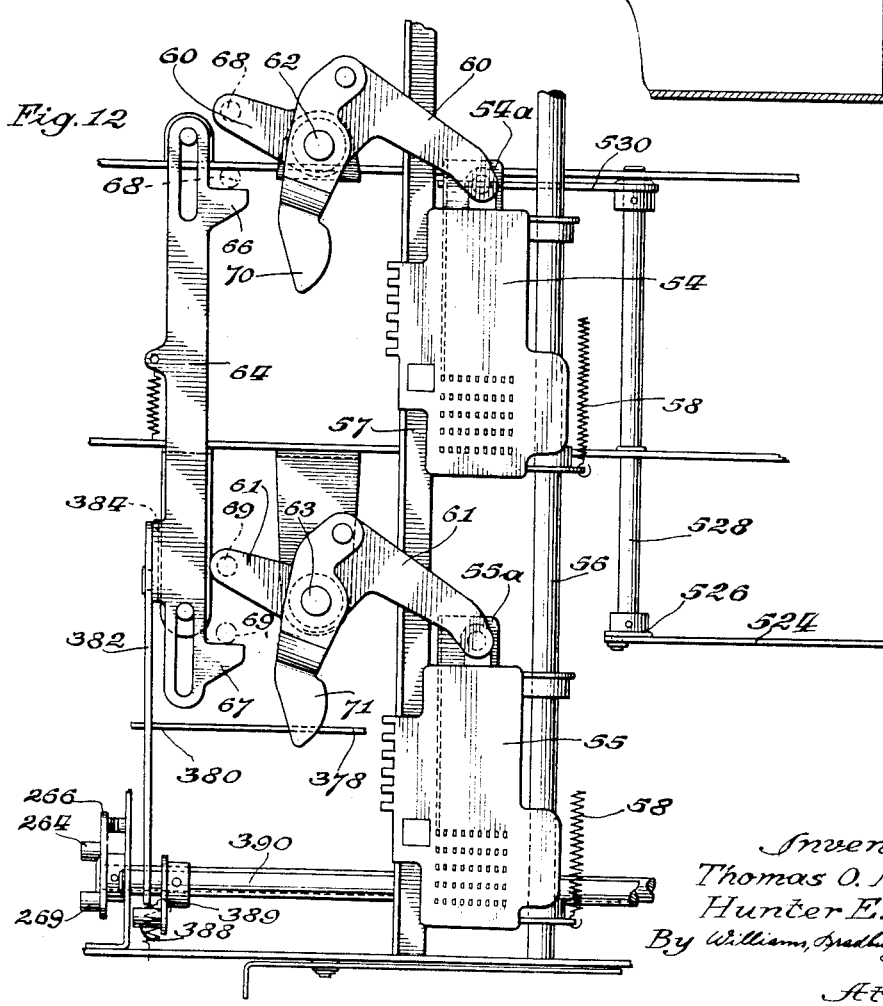

Figs. 3, 4, 5, 6, 7, and 8 are fragmentary vertical sectional views, taken on the lines 3—3, 4—4, 5—5, 6—6, 7—7, and 8—8, respectively, of Fig. 2;

Fig. 9 is a fragmentary generally vertical sectional view, looking in the direction of the arrows of 9—9 of Fig. 4, and showing the parts in the position assumed just following a multiplicand listing operation;

Fig. 10 is a view similar to Fig. 9, showing the parts in normal position;

Fig. 11 is a generally horizontal fragmentary sectional view, taken on the line 11—11 of Fig. 4;

Fig. 12 is a generally horizontal fragmentary sectional view, showing the pin carriages and their operating mechanism;

Fig. 13 is a timing chart, showing the sequence of operations;

Fig. 14 is a diagram illustrating the method of performing the multiplying operations;

Fig. 15 is a fragmentary horizontal sectional view of the operating mechanism for the zero stop of the pin carriages, multiplier rack feed pawl, total transfer, and other parts actuated by the main shaft;

Fig. 16 is a fragmentary vertical sectional view of the accumulator shifting mechanism and other operating mechanism driven from the main shaft, taken on the line 16—16 of Fig. 15;

Fig. 17 is a fragmentary vertical sectional view taken on the line 17—17 of Fig. 16;

Figs. 18, 19, and 20 are fragmentary vertical sectional views showing the total transfer slide and its operating mechanism in different operating positions; and, Fig. 21 is a fragmentary view showing the multiplier feed pawl operating mechanism.

General description

It is believed that the detailed description of our invention will be more readily understood if it is preceded by a brief general description of the functioning of the machine in the performance of multiplying operations and of the general method employed in the performance of problems in multiplication.

An understanding of the general principles of the operation of the machine may best be acquired by following the multiplying method with reference to a specific example, such as that diagrammed in Fig. 14.

With reference to Fig. 14, it is assumed that the problem is to multiply 95147 by 36809. The machine has two ten-key keyboards, one for the entry of the multiplicand, 95147, and the other for the entry of the multiplier, 36809. Each keyboard controls a set of actuator racks, hereinafter referred to as the multiplicand actuator racks and the multiplier actuator racks. These racks each are adapted to control appropriate printing mechanisms for making a record of the problem upon the first actuation of the machine. The multiplicand racks have associated therewith four lower accumulators and one upper accumulator, which latter may be considered the master accumulator.

For the purposes of this general description, the master accumulator may be considered the units order accumulator, since its units accumulator wheel is always used to accumulate digits of units value. The four lower accumulators are for convenience designated as "tens," "hundreds," "thousands," and "ten thousands," accumulators, because during the final totalling operation of the machine they are shifted so that their accumulator wheels, which would ordinarily be in units positions, are, during the operation of the machine, shifted, respectively, to the tens, hundreds, thousands, and ten thousands, positions with respect to the multiplicand actuators and with respect to the accumulator wheels of the master or upper accumulator. For convenience, these accumulators will hereinafter be designated as accumulator U1, i. e., the upper or master accumulator, and L2, L3, L4, and L5, the lower accumulators.

Referring now to Fig. 14, upon the first cycle of operation, accumulators U1, L3, L4, and L5, will be enmeshed with the multiplicand actuating racks, so that each of these accumulators will have the amount 95147 added therein. The accumulator L2 will not be engaged because the tens digit of the multiplier is zero.

The second and third cycles of operation will be identical with the first, but on the fourth cycle of operation, the accumulator L5 will not be engaged because the ten thousands digit of the multiplier is 3 and the multiplicand will have been added into the accumulator L5 three times during the first three cycles of operation. Similarly, after the completion of the sixth cycle of operation, the accumulator L4 will be maintained out of engagement with the multiplicand actuator racks, and after the completion of the eighth cycle of operation, the accumulator L3 will be maintained out of engagement with the multiplicand actuator racks. Since the units digit of the multiplier is 9, it will be required that the units order upper master accumulator, U1, be brought into engagement with the multiplicand actuator racks during each of the first nine cycles of operation of the machine so that the multiplicand will be added into this accumulator nine times.

As a result of the first nine cycles of operation of the machine, the accumulator U1 will contain a sub-product equal to nine times the multiplicand, i. e., 856323, and the accumulator L2, having never been brought into engagement with the actuator racks, will register zero. By "sub-product," we mean the product of the multiplicand and one digit of the multiplier. Thus, the product of the multiplicand and the multiplier may be considered as the sum of the sub-products, with due consideration to the denominational characteristics of the sub-products.

The accumulator L3 will have had eight times the multiplicand, namely, 761176 accumulated thereon, and, similarly, the accumulators L4 and L5 will have had six and three times the multiplicand, i. e., 570882 and 285441 accumulated thereon.

After these sub-products have thus been accumulated in the individual accumulators, the accumulators are automatically shifted relative to the multiplicand actuator racks amounts corresponding to their respective denominational orders. In other words, the accumulator L2 will be shifted so that its units wheel will be in position for engagement with the tens multiplicand actuator rack, and similarly, the accumulators L3, L4, and L5, will be shifted so that their units wheels will lie, respectively, in positions for engagement with the hundreds, thousands, and ten thousands multiplicand actuator racks. This shifting operation is performed during the tenth cycle of operation of the machine for the example given.

During the tenth cycle of operation, the accumulator L5, in its displaced position, is engaged with the multiplicand actuator racks in a manner to transfer its accumulation to the master accumulator U1 and be reset to zero.

During the eleventh cycle of operation, the accumulator L4 will have its sub-product transferred to the accumulator U1, the transfer being effected with the L4 accumulator shifted so that its sub-product is added into the accumulator U1 in the proper denominational order. Similarly, on the twelfth and thirteenth cycles, the sub-products accumulated in the accumulators L3 and L2 are transferred to the accumulator U1 with the accumulators shifted to cause the entry of their sub-products in the proper denominational order with respect to the accumulator U1. In the example given, the accumulator L2 has no entries, so that this thirteenth cycle of operation would not affect the accumulation in the accumulator U1.

The fourteenth cycle of operation constitutes a total taking operation of the accumulator U1, and during this operation, the total or product 3,502,265,923 is printed.

Thus, by going through fourteen cycles of operation, a multiplication involving a five digit multiplicand and a five digit multiplier may readily be performed. It will be apparent to those skilled in the art that if this problem of multiplication had been performed by the common method of repeated addition, twenty-seven operating cycles of the machine would have been required. A saving of approximately half the number of cycles of operation, and hence half the time, is therefore obtained by utilizing the method of our invention.

The advantages of our invention would be more strikingly revealed if a problem of multiplication other than that chosen for illustrative purposes and diagrammed in Fig. 14 had been chosen. For example, if the problem were to multiply 99,999 by 99,999, the number of operating cycles required by the use of the method of our invention would have been identical with that above described, the only difference being that all of the accumulators would have been engaged with the multiplicand actuator racks during each of the first nine cycles of operation. If, however, it were endeavored to perform this problem by the common method of multiplication, using repeated addition, it would require forty-six operations of the machine. Thus, in the extreme case, the method of our invention would require but one-third of the time which would be required for the performance of the same problem by the method of repeated addition.

By the method of our invention, it is never necessary, irrespective of the multiplication problem, for the machine to operate through more than fourteen cycles. If the largest digit in the multiplier is less than 9, the number of operating cycles required will be reduced from fourteen by the difference between the largest digit in the multiplier and the digit 9. For example, if the largest digit in the multiplier is 4, only nine cycles of operation would be required, assuming that the multiplier has five digits. If the multiplier contains less than five digits, the number of operating cycles will be reduced by the difference between five and the number of digits in the multiplier.

As compared with other methods of machine multiplication using accumulators whereby the multiplication is effected by various mixed adding and subtracting operations, our invention

Amount setup, actuating, and printing mechanism

Figure 1:
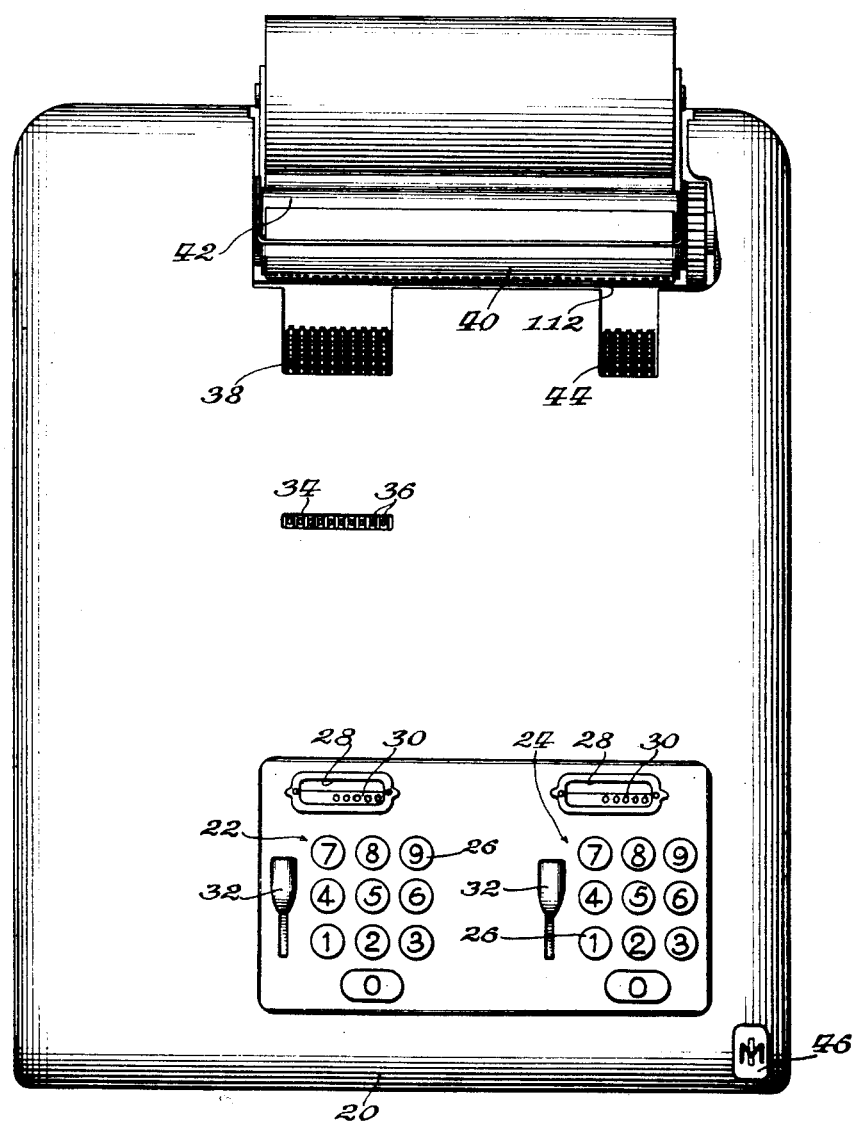
Fig. 1 is a plan view of the machine.

Referring to Fig. 1, the machine comprises a casing 20 having a multiplicand keyboard 22 and a multiplier keyboard 24. Each of these keyboards is of the ten key type and includes digit keys 26 from 0 to 9. Each of the keyboards includes a window 28, through which a carriage position indicator 30 is visible to apprize the operator in the usual manner of the number of digits which have been entered by depression of the keys. Each of the keyboards also includes a correction key 32, by which its respective pin carriage and any set up pins may be restored to normal position. The casing has a sight opening 34, through which product indicating register wheels 36 are visible.

A group of ten type wheels forming a printing mechanism 38, hereinafter to be described in greater detail, are provided for imprinting the multiplicand, and also the product, upon a paper strip 40 carried by a suitable roller platen mechanism 42. A set of five type wheels forming a printing mechanism 44 are provided for similarly imprinting the multiplier upon the paper record strip 40. A control key 46 is provided to initiate operation of the machine, this key controlling the driving motor as well as performing other functions, hereinafter to be described.

Figure 3:
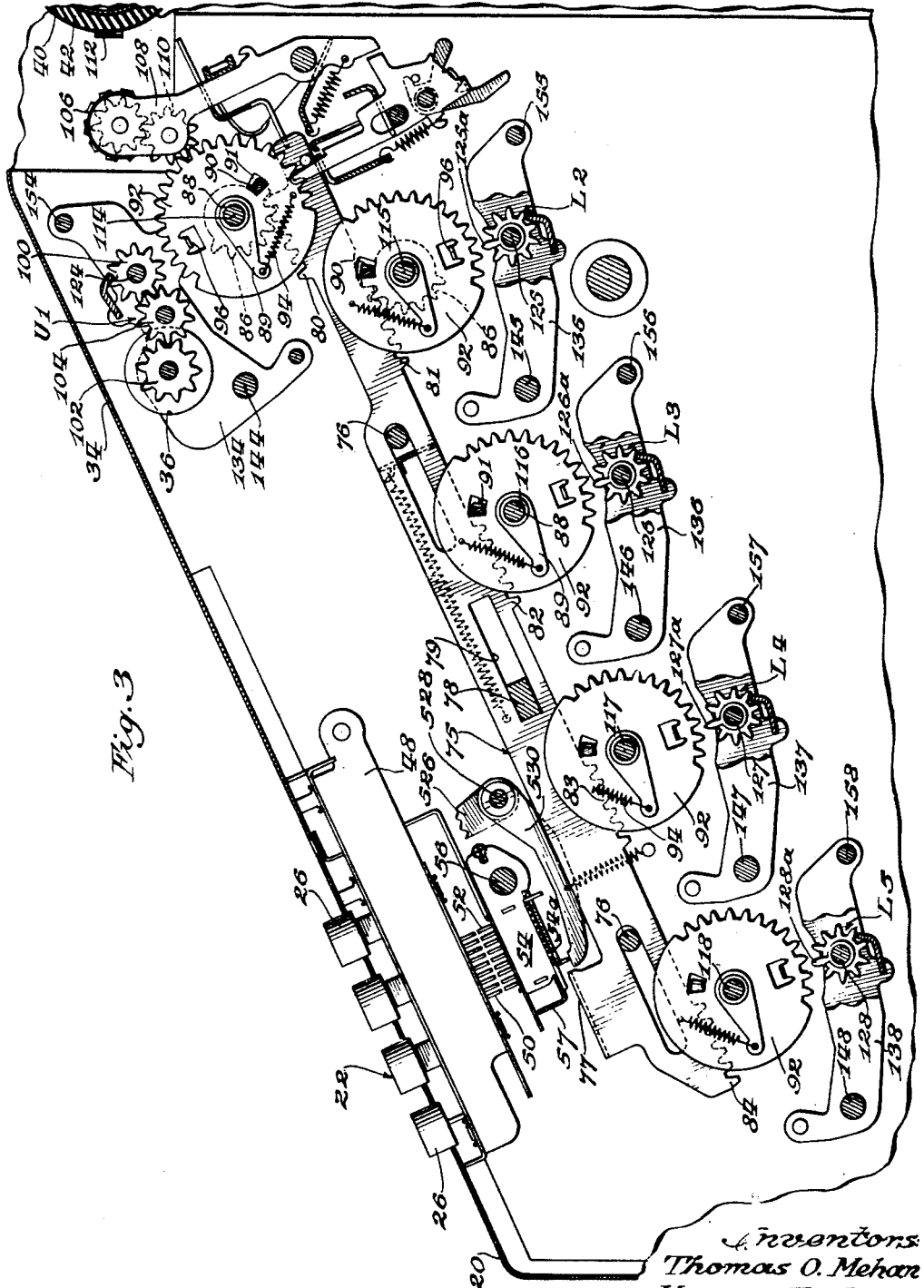
Figure 5:
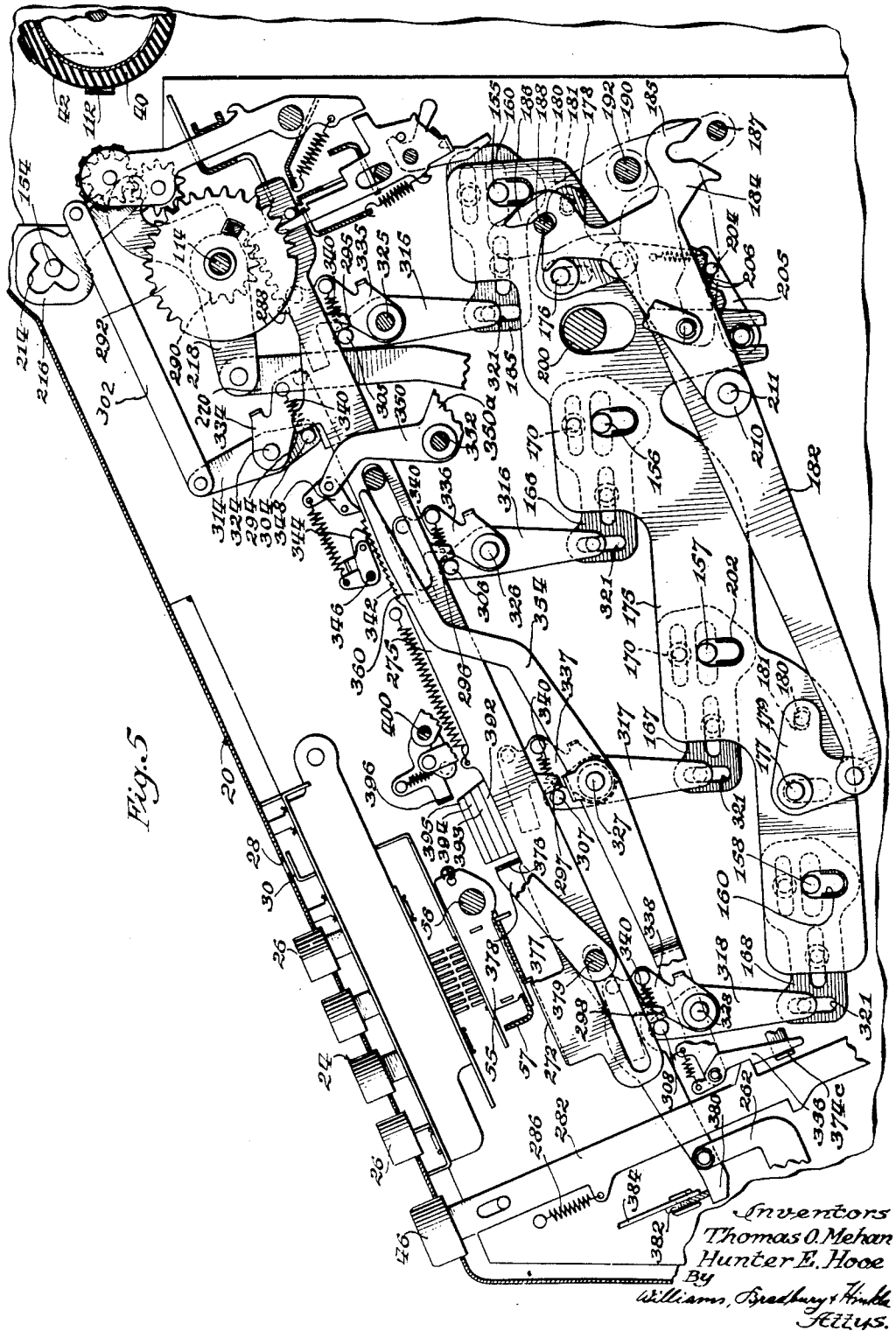

Referring particularly to Figs. 3, 5 and 12, the multiplicand keys 26 are suitably mounted for vertical movement in a key-supporting frame 48, which will include the usual means for guiding the keys and resilient means for returning them to normal position. Each of the keys has a stem projection 50, these projections being in a line above a row of pins 52 carried in a stop carriage 54. The stop carriage 54 is mounted for sliding movement transversely of the machine upon a rod 56 and a rail 57. The carriage is adapted to be stepped one space to the left of the machine (referring to the position in which it is shown in Fig. 9) by a suitable escapement mechanism, which is not shown herein, but may be of any suitable construction, such, for example, as that shown in the copending application of Thomas O. Mehan, Serial No. 313,896, filed January 15, 1940.

The multiplier keyboard 24 is similar to the multiplicand keyboard, and, as shown in Fig. 5, is provided with a pin carriage 55, likewise slidable upon the fixed rod 56 and the rail 57.

Referring to Fig. 12, it will be apparent that each of the pin carriages 54 and 55 is normally urged to move to the left of the machine by tension springs 58 which are suitably anchored to a stationary part of the machine. In Fig. 12, the carriages 54 and 55 are shown in their normal position, to which they are returned during the proper time in the operation of the machine by Z-shaped levers 60 and 61, respectively, pivoted upon stationary studs 62 and 63, respectively (see also Fig. 9). A restoring slide 64 is suitably mounted for movement transversely of the machine and has a pair of projecting lugs 66, 67, which are adapted to contact downwardly projecting pins 68, 69, respectively, and thereby swing the levers 60 and 61 clockwise (Fig. 12) to restore the pin carriages 54, 55 to normal position. The means for operating the restoring slide will be described hereinafter.

Rigidly secured to the levers 60 and 61 are arms 70 and 71 which are adapted to be engaged by the stems of the correction keys 32 to restore the pin carriages to normal position, as more fully disclosed in the aforesaid application Serial No. 313,896.

Referring to Figs. 2 and 3, there are ten multiplicand actuator racks 75 guided for reciprocation longitudinally of the machine upon a pair of fixed rods 76 projecting through suitable elongated slots in the racks. The actuator racks 75 are normally held in their forward positions by a bar 78 forming part of a restoring bail, and which projects through suitable elongated slots 79 formed in the actuating racks 75. The operating means for the restoring bail, the means for holding the actuator racks 75 in properly spaced relationship, as well as the means by which the motion of the actuator racks is transmitted to the accumulator, the accumulator transfer or carry-over mechanism, and associated parts, are more fully disclosed in the copending application of Thomas O. Mehan, Serial No. 372,289, filed December 30, 1940, while the printing mechanism and operating means therefor are more fully disclosed in the copending application of Thomas O. Mehan, Serial No. 372,290, filed December 30, 1940. Since these parts are more or less conventional in adding machines, they are not herein illustrated or described in great detail.

Each of the actuator racks 75 has a stop projection 77 adapted to engage and limit against a depressed pin of the stop carriage 54.

As shown in Fig. 3, each of the actuator racks 75 has a plurality of rack toothed sections 80, 81, 82, 83, and 84, for the operation of accumulators, designated generally as U1, L2, L3, L4, and L5, respectively. Each of the rack sections 80 to 84 meshes with a segmental pinion 86 secured to a sleeve 88, to which an arm 89 is rigidly secured. The segmental pinion 86 has a sidewardly extending lug 90 which projects into an opening 91 formed in a segmental gear 92. The arm 89, and hence the segmental pinion 86, are normally urged to move (counterclockwise for accumulator U1 and clockwise for the remaining accumulators) with respect to the segmental gear 92 by a tension spring 94, which operation is normally prevented by the engagement of a lug 96 with the pawl of a transfer mechanism, which, for the sake of brevity, is not disclosed or described in this present application, but is shown and described in the aforesaid application Serial No. 377,299. The segmental gears 92 are adapted to mesh with accumulator pinions 100 which are brought into engagement with the segmental gears 92 and disengaged therefrom by a suitable mechanism, to be described hereinafter. The accumlator pinions 100 for the upper or master accumulator U1, are connected to drive pinions 102 of the visible dials 36 through idler pinions 104.

Type wheels 106 are carried at the end of individual arms 108 and are adapted to be rotated to predetermined positions by the segmental gears 92 through intermediate idler pinions 110, the particular means for causing the type wheels to fire and to make a printing impression being disclosed in the aforesaid application Serial No. 372,290, but generally, it may be stated here that the type fire against a ribbon 112 to make an inked impression upon the record strip 40 carried by the platen mechanism 42.

From the foregoing, it will appear that the depression of keys 26 of the multiplicand keyboard 22 is adapted to control the rearward excursion of the actuator racks 75, and, upon their return strokes, through the segmental gears 92 and associated mechanisms, drive the accumulator pinions 100 distances corresponding respectively to the amount set up in the pin carriage 54, and that this amount may be imprinted upon the record strip 40. It will be apparent also that the amount set up in the keyboard 22 may also be added into the accumulators L2 to L5 upon each rearward and forward movement of the actuating racks 75, depending upon whether such accumulators are brought into mesh with their associated segmental gears 92. The accumulators L2 to L5 may be identical in construction with the accumulator U1, except for the omission of the indicating dials 102 and the idler pinions 104.

The segmental gears 92 for the accumulators U1 and L2 to L5 are mounted for rotation on their respective sleeves 88, and the latter are mounted upon shafts 114, 115, 116, 117, and 118, respectively, while the accumulator pinions for these accumulators are mounted, respectively, upon shafts 124, 125, 126, 127, and 128, respectively. Each of the accumulators is mounted in a suitable frame, represented by side members 134, 135, 136, 137, and 138, respectively, which are pivoted (so as to permit engagement of the accumulator wheels with their respective segmental gears), upon shafts 144, 145, 146, 147, and 148, respectively. Each of the frames is provided with a sidewardly extending stud 154, 155, 156, 157, and 158, respectively, by which the frame may be moved about its pivot shaft.

Figure 6:
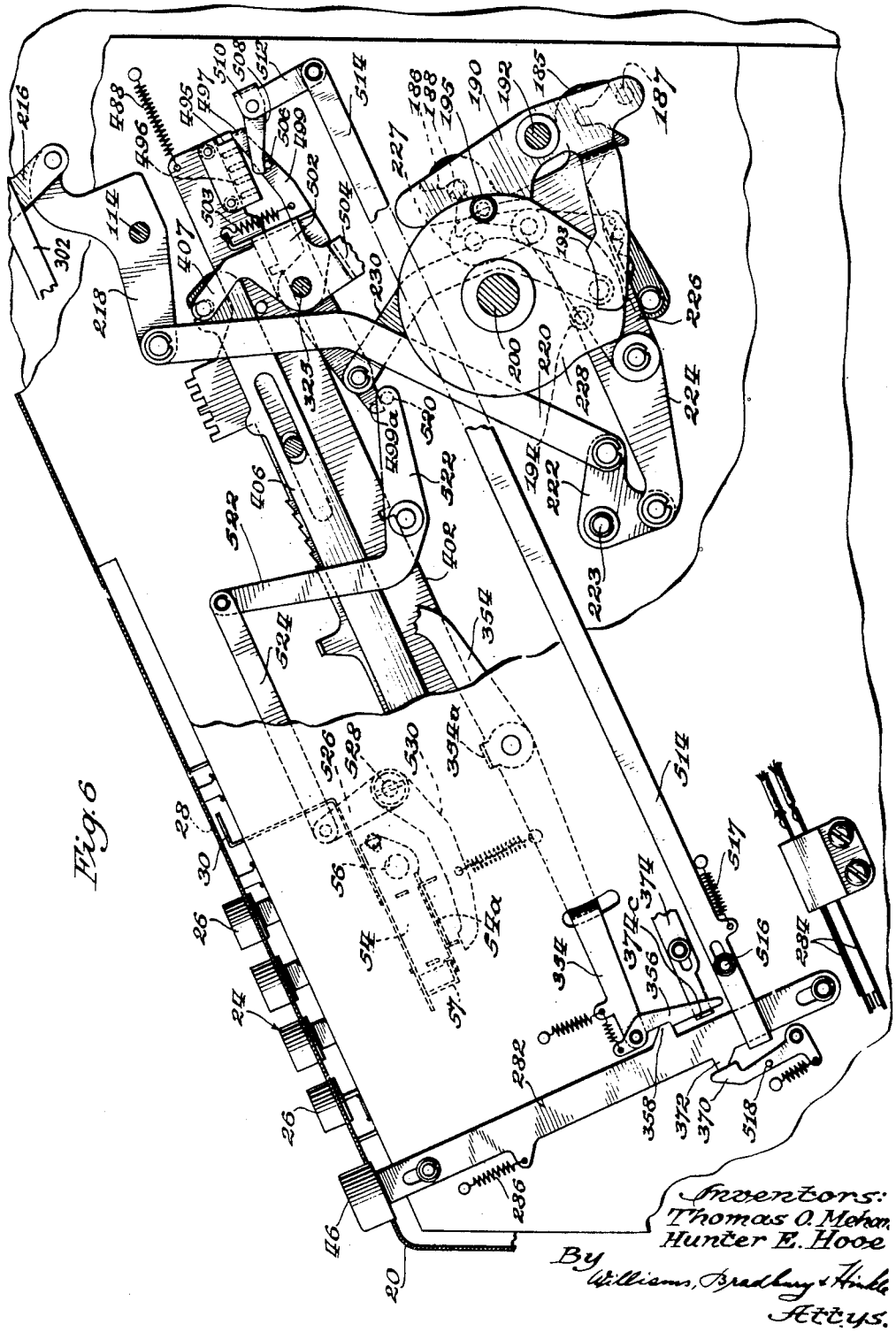

The actuating means for engaging and disengaging the accumulators with their respective segmental gears 92 is best shown in Figs. 4, 5, and 6.

The lower accumulators L2 to L5 are moved into and out of engagement, as stated, by means operating on the studs 155 to 158. These studs project through T-shaped slots 160 formed in selector slides 165, 166, 167, and 168, respectively, these slides being mounted for generally horizontal movement upon headed studs 170 secured to an accumulator engaging beam 175, the studs 170 projecting through suitable elongated slots formed in the selector slides. The accumulator engaging beam 175 is guided for vertical movement by a pair of fixed studs 176 and 177 projecting through suitable elongated vertical slots in the beam 175. Pivoted upon the studs 176 and 177 are bell cranks 178 and 179, respectively, each of which has a stud 180 projecting into an elongated slot 181 formed in the beam. Thus, upon counterclockwise pivotal movement of the bell crank levers 178 and 179, the beam 175 will be raised.

The means for thus moving the bell cranks 178 and 179 counterclockwise comprises a link 182, the ends of which are respectively pivoted to the downwardly extended arms of the bell cranks 178 and 179 and which carries a forked accumulator engaging selector 184 which has open-end slot portions 185 and 186 engageable, respectively, with studs 187 and 188. These studs are carried by a three-armed lever 190 pivoted upon a fixed shaft 192. The three-armed lever 190 has a pair of camming surfaces 191 and 193 (Fig. 4) which are adapted to be engaged by roller bearing studs 194 and 195 projecting from the opposite sides of a plate cam 196, the latter being non-rotatably secured to the main shaft 200 of the machine. In Fig. 4, these parts are shown in their normal positions. Upon rotation of the main shaft in a clockwise direction through an angle of approximately 207°, the stud 194 engages the cam surface 191 and swings the three-armed lever 190 clockwise, thus, through the pin 188 carried thereby, moving the forked accumulator engaging selector 184 rearwardly, and through the link 182, swinging the bell cranks 178, 179, counterclockwise to raise the beam 175.

When the selector slides 165 to 168 are in the positions in which they are shown in Fig. 5, there will be no operative driving connection between the beam 175 and these studs because these studs will be in alignment with the vertical portions of the T-shaped slots 160, and, since the studs also project freely through elongated vertical slots 202 formed in the beam 175, the beam and parts operatively connected thereto will be held in either one of the two extreme positions of movement by a detent 204 engageable with one or the other of two notches 206 formed in the link 182, the detent 204 being indicated as a stud carried by a spring-pressed arm 205.

If, however, one or more of the slides 165 to 168 had been moved either to the right or to the left of the normal position in which these parts are shown in Fig. 5, the T-shaped slots of such actuated slides would be in operative engagement with their associated studs 155 to 158, and thus an operative actuating connection would be provided between the beam 175 and the associated accumulator supporting cradle or frame 135 to 138 (Fig. 3). It will be understood that during ordinary adding operations, the accumulators should be brought into mesh with their respective segmental gears 92 prior to the beginning of the return strokes of the actuating racks 75, and should be disengaged from such segments upon the completion of the return strokes of the actuating racks 75.

To accomplish the disengagement of such accumulators as have been brought into engagement, the beam 175 must be lowered. This is accomplished by the engagement of a camming surface 208 on the plate cam 196 with a roller 210 mounted on the stud 211 by which the forked accumulator engaging selector 184 is pivoted to the link 182. Such engagement causes forward movement of the link 182, and hence clockwise movement of the bell cranks 178, 179 and consequent lowering of the beams 175, thus restoring all the parts to normal position.

When any of the lower accumulators are to be cleared, as is necessary in transferring their totals to the master accumulator U1, a link 212 (Fig. 4) is actuated by means, hereinafter to be described, to swing the forked accumulator engaging selector 184 downwardly about its pivot stud 211 and thereby cause engagement of its slotted hook portion 185 with the stud 187, causing clockwise rotation of the three-armed lever 190. Under these circumstances, the cam portion 193 of the three-armed lever 190 will be moved upwardly from the position in which it is shown in Fig. 4 so that after the main shaft has rotated through an angle of 50°, the stud 195 on the plate cam 196 will engage the cam surface 193 and swing the three-armed lever 190 counterclockwise, and, through such movement transmitted through the link 182 and bell cranks 178, 179, raise the beam 175. Thus, such accumulator as is selected for operation will be engaged prior to the beginning of the rearward stroke of the actuating racks 75, and will be held in engagement until prior to the commencement of the forward stroke of the actuating racks 75, whereupon, the accumulator beam will be moved downwardly to disengage the selected accumulators in the following manner: The stud 194 engaging the cam surface 191 of the three-armed lever 190 will swing the latter clockwise and hence move the link 182 forwardly and lower the beam 175.

The upper accumulator U1 is engaged and disengaged from its segmental gears 92 by a mechanism similar to that utilized to cause engagement and disengagement of the lower accumulators, this mechanism being best shown in Figs. 3, 5, and 6. The stud 154 attached to the tilting cradle or frame 134 projects through an inverted T-shaped slot 214 formed in a selector arm 216 which is pivoted upon the end of a lever 218, the latter being pivoted upon the shaft 114. The forwardly extending arm of the lever 218 has a link 220 pivoted thereto, this link extending downwardly and being pivotally connected to one arm of a bell crank 222 (Fig. 6) which is pivotally mounted upon a fixed stud 223. The other arm of the bell crank 222 is pivotally connected to a link 224 corresponding to the link 182 previously described and carrying a forked accumulator engaging selector 226. The link 224 is supported by the bell crank 222 and by a swinging arm 227. A plate cam 228 is secured to the main shaft 200, the plate cam 228 being identical with the plate cam 196 and operating through identical mechanism to shift the link 224 in the same manner that the link 182 is shifted, causing engagement and disengagement of the upper accumulator U1 in the same manner that a selected lower accumulator is engaged and disengaged with its segmental gears. The forked accumulator selector 226 is moved from its adding position, as shown in Fig. 6, to its total-taking position (in which the selector 226 is swung downwardly from the position shown) by a link 230. The means for operating the link 230 will be hereinafter described.

*Mechanism for shifting accumulators laterally*

It will be recalled from the initial general description of the operation of the machine that it is necessary, during the taking of a total of the sub-products appearing on the lower accumulators L2 to L5, that the accumulators be shifted laterally from their normal denominational positions the extents necessary to cause their units wheels to be positioned for engagement with the tens, hundreds, thousands, and ten thousands actuating racks 175, respectively. The means for accomplishing this lateral shifting of the accumulators will now be described, referring particularly to Figs. 2, 4, 9, and 10.

As shown in Figs. 2 and 9, particularly with reference to the accumulator L5, its supporting frame 138, which is carried by the shaft 148, may be shifted laterally to the left of the machine, for this purpose, the left hand end of the shaft 148 being provided with a yoke formed by a pair of flanges 238 which is engaged by the rounded upper ends of a pair of arms 240 secured to a shaft 242.

In a similar manner, the shafts 145, 146, and 147 are provided with yokes at their left-hand ends. The spaces between the flanges 238 for these various shafts are, however, successively greater so that upon swinging the arms 240 counterclockwise (Fig. 9), through an angle sufficient to move the units wheel of the accumulator L5 into position beneath the ten thousands actuator rack 75, the units wheels for the accumulators L2, L3, and L4, will be moved, respectively, beneath the actuator racks for the tens, hundreds, and thousands denominational orders.

Feather keys 125a, 126a, 127a, and 128a (Fig. 2) are secured to their correspondingly numbered accumulator shafts to prevent movement of the multiplicand racks 75, which (when the accumulators are shifted laterally) lie to the right of the units pinions of the accumulators. Similar keys 125b, 126b, and 127b are fixed to their correspondingly numbered shafts to prevent movement of the racks 75 to the left of the highest order accumulator pinion.

The shaft 242 is suitably mounted in bearing brackets attached to one of the vertical frame plates of the machine, and at its forward end carries an arm 244, to the outer end of which is secured a link 246. The right-hand end of the link 246 is guided on a fixed stud 247 projecting through an elongated slot 248 formed in the link, and the link is adapted to be held in either of two positions by a spring-pressed detent arm 250 carrying a roller 251 engageable either with a notch 252 or a notch 253 formed in the link 246. When the link 246 is in the position shown in Fig. 9, with the detent roller 251 in the notch 253, the accumulators are in adding position. When, however, as will hereinafter appear, it is desired to clear the lower registers to transfer their accumulations to the upper accumulator U1, the link 246 is shifted to the right, as shown in Fig. 10, in which position the detent roller 251 rests in the notch 252 to hold the link and connected parts in this position.

A selector slide 254 is mounted for vertical sliding movement on the right-hand end of the link 246, this slide having a lug 255 projecting to the right near the top thereof and a hook 256 likewise projecting to the right at the bottom of the slide. The slide is also provided with a horizontal elongated slot 258 which receives a stud 260 carried by a link 262 guided on a fixed stud 263. The means by which the link 262 is operated to raise and lower the slide 254 will hereinafter be described, but it will be apparent that when the slide is in its upper position, as shown in Fig. 9, its hook portion 256 will be in position for engagement by a stud 264 carried by a lever 266 secured to the end of a shaft 268, the lever at its opposite end carrying a stud 269. On the other hand, when the slide 254 is in its lowermost position, its sidewardly projecting lug 255 will be in position for engagement by the stud 269 when the lever 266 is swung in a counterclockwise direction. The lever 266 is returned to the position in which it is shown in Figs. 9 and 10 by a tension spring 267. The oscillation of the shaft 268 thus provides for the movement of the link 246 to the left when the stud 269 engages the lug 255, and provides for movement of the link 246 to the right when the stud 264 engages the hook 256. The shaft 268 is oscillated through an angle represented by the full and dotted line positions of the pins 264 and 269 during each cycle of operation of the machine, but it is only upon the first cycle of operation following a change in position of the slide 254 that such oscillation of the shaft 268 has any effect, for during such first cycle, its stud 269 (or stud 264) will engage the lug 255 (or hook 256) and shift the link 246 to the left (or to the right) to the position in which it is shown in Fig. 9 (or Fig. 10), and the link and parts connected therewith will remain in this position. As will appear hereinafter, the link 262 and the slide 254 will remain in their lower positions during the initial essentially adding operations of the machine, but will be shifted to the positions shown in Figs. 9 and 10 during the total-transfer operations.

The shaft 268 may be thus oscillated by any suitable drive connected to the main shaft, such as that shown in Figs. 15, 16, and 17. In these figures, the shaft 268 is shown as extending rearwardly and having an arm 268a secured thereto. The arm 268a carries a follower roller 268b which engages a cam 268c secured to the main shaft 200.

The lower accumulators are held in displaced position by the detent 250, 251 (Fig. 10), but, if desired, additional detent devices may be provided on each of the accumulator-carrying frames to hold the accumulators from creeping from their displaced positions due to vibration of the machine.

*Multiplier racks, and parts operated and controlled thereby*

Referring to Figs. 2, 4, 5, 9, and 10, the pin carriage 55, the pins of which, it will be recalled, are set up by depression of the multiplier keyboard 24, is adapted to be engaged by stops 272 on multiplier racks 275, mounted for reciprocation in a manner similar to that in which the multiplicand actuating racks 75 are mounted. The racks 275, like the racks 75, are normally urged to slide rearwardly by tension springs 276, but are normally held in the position shown in Fig. 4 by detent pawls 344, hereinafter to be described.

The lower end of the motor control key stem 282, as shown in Fig. 6, is adapted to engage the insulated upper arm of a pair of switch arms 284 suitably secured to one of the frame plates of the machine. As shown in the copending application of Thomas O. Mehan, Serial No. 359,271, filed October 1, 1940, the switch provided by the switch arms 284 may be utilized to energize a solenoid which, through suitable mechanism, will result in the energization of an electric drive motor and the engagement of a one-revolution clutch to connect the driving motor to the main shaft 200. As long as the switch provided by the arms 284 remains closed, such solenoid will be energized upon the completion of each cycle of operation, and the one-revolution clutch will remain engaged after the completion of each revolution of the main shaft, so that, under such circumstances, the machine will continue through successive operating cycles until the motor control key stem 282 is released and permitted to move upwardly, thereby allowing the switch arms 284 to separate.

The key stem 282 is returned to normal position by a tension spring 286 provided it is not held in its lowermost position by latching means, hereinafter to be described, it being understood that such latching means is effective to hold the key stem depressed throughout the necessary number of operating cycles.

Each of the multiplier racks 275 has a rack portion 288 meshing with a segmental pinion 290 which is directly attached to a segmental gear 292, the segmental gears 292 being geared to type wheels constructed and mounted in the manner previously described with reference to the multiplicand actuating racks 75.

The units order multiplier rack 275 is provided with a lug 294, while the multiplier racks for the tens, hundreds, thousands, and ten thousands orders are provided with downwardly extending lugs 295, 296, 297, and 298, respectively. The lug 294 of the units rack ordinarily engages a stud 304 attached to a lever 314 pivoted on a fixed stud 324, the opposite end of the lever 314 being pivotally connected to the forward end of a link 302 which, at its rearward end, is pivoted to the selector arm 216.

Similarly, the lugs 295 to 298, respectively, engage studs 305 to 308, carried at the upper ends of levers 315 to 318 which are pivotally mounted on fixed studs 325 to 328, the lower ends of these levers 315 to 318 carrying studs projecting sidewardly into slots 321 formed in the selector slides 165 to 168, respectively.

In addition to being capable of operation by the lugs 294 to 298, the levers 314 to 318 may, under certain circumstances hereinafter to be described, be operated by spring arms 334 to 338, respectively, these arms being effective to swing their associated lever 314 clockwise and levers 315 to 318 counterclockwise during the total transfer operation. These spring arms 334 to 338 are pivoted on the studs 324 to 328. Springs 340 are, respectively, attached to the studs 304 to 308 and suitable anchoring studs on the spring arms 334 to 338, and normally urge the lever 314 to swing counterclockwise and the levers 315–318 to swing clockwise (Fig. 5).

Each of the multiplier racks 275 is provided with ratchet teeth 342 which are adapted to be engaged, respectively, by the previously mentioned individual holding pawls 344 suitably pivoted and spaced upon a fixed rod 346. The ratchet teeth 342 are also adapted to be engaged by an actuating pawl 348 which, as shown in Fig. 2, extends across all five multiplier racks 275, and thus is adapted simultaneously to restore displaced multiplier racks toward normal position, one step at a time. The pawl 348 is pivotally mounted upon the upper ends of a pair of arms 350 which are pivoted on a shaft 352. The pawl 348 is oscillated through an angle sufficiently to swing the tooth of the pawl 348 a distance slightly more than the pitch of the ratchet teeth 342. As best shown in Figs. 15 and 21, one of the arms 350 has a downwardly and rearwardly extending portion 350a carrying a roller 350b cooperable with a plate cam 351 secured to the main shaft 200. The pawls 344 and 348 normally are in the positions shown in Figs. 4, 5, and 21, for engagement with the ratchet teeth 342.

During the first cycle of operation of the machine, it is necessary to raise the pawls 344 and 348 from their engagement with the ratchet teeth 342 in order to permit the racks 275 to move rearwardly to positions determined by the setting of the multiplier keyboard. The means for accomplishing this result comprises a long lever 354 having a cross-over portion 354a pivoted on the stud 327, and carrying a latch 356 at its forward end. This latch is yieldingly held in engagement with a lug 358 formed on the motor key stem 282 so that upon depression of the latter at the beginning of the first cycle of operation, the long lever 354 will be swung counterclockwise. The rearward end portion 360 of the lever 354 lies beneath sidewardly extending pins 362 and 364 (Fig. 4), the pin 362 forming part of a bail 366 pivoted upon the rod 346 and adapted to engage the upwardly extending portions of all of the latches 344. The pin 364 projects from the side of the common pawl 348, and thus, when the rearward portion 360 of the lever 354 is raised, all of the pawls 344 will be swung counterclockwise and the pawl 348 will be swung clockwise against the tension of springs 368.

Since the motor key stem is held in depressed position by a latch 370 (Fig. 6) engaging a forwardly projecting lug 372 on the key stem 282, it is necessary to provide some means for releasing the latch 356 after the multiplier racks 275 have been differentially positioned. This means comprises a slide 374 (Figs. 2, 6, and 16) which is mounted for reciprocation and near its rearward end carries a follower roller 374a cooperable with a cam 374b secured to the main shaft 200. The forward end of the slide 374 has a sidewardly bent ear 374c which lies in front of the latch 356.

Figure 8:
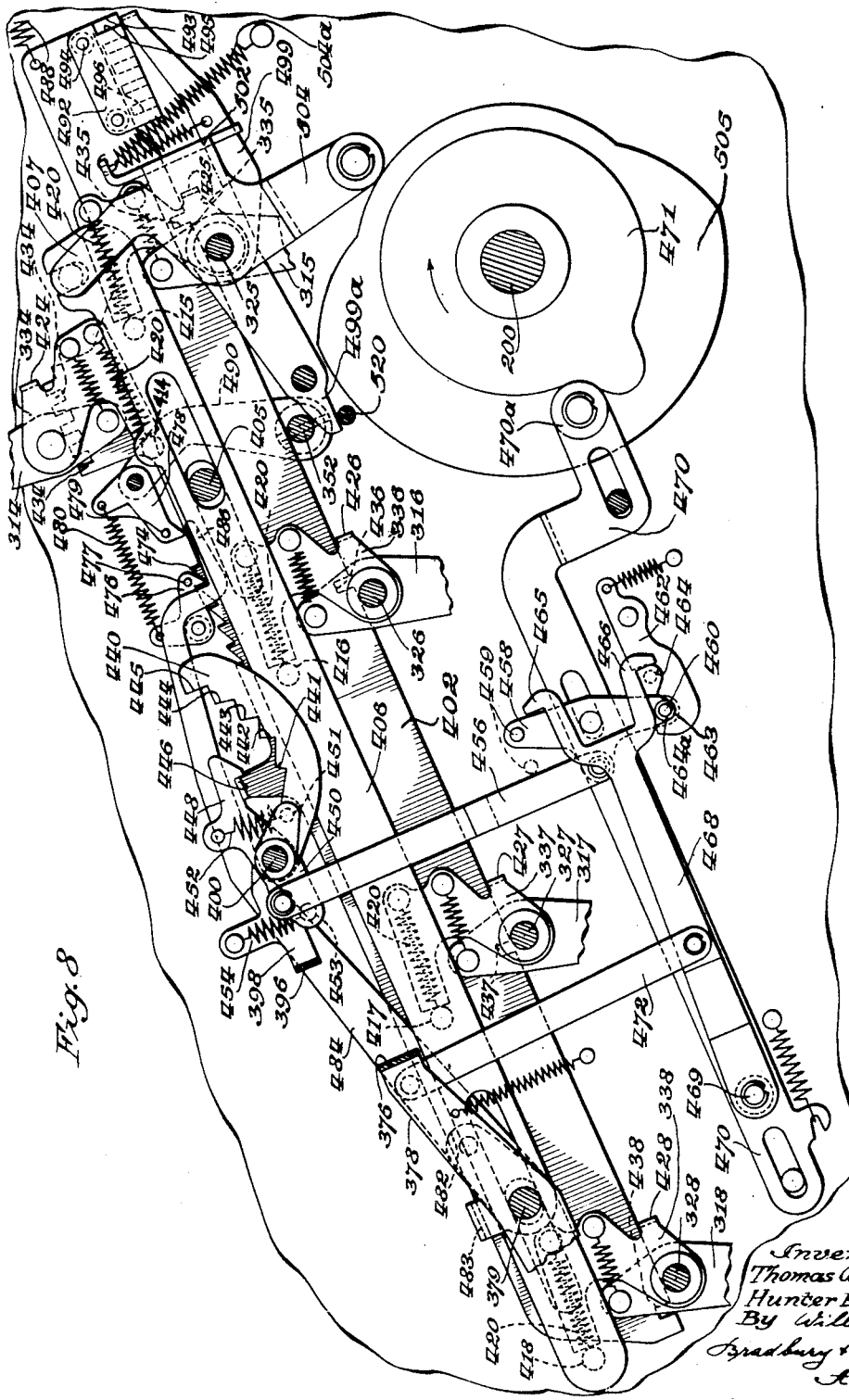

Means are provided to control the restoration of the stop pin carriages. This means comprises a bail having a cross member 376 (Fig. 4) and arms 377 and 378 (Fig. 8). The bail arms are pivoted upon a guide rod 379 which also serves as one of the supports for the multiplier racks 275. The arm 378 has a forward extension 380, near the end of which it is pivotally connected to the link 262 (Fig. 9).

When the parts of the machine are in normal position, the cross bar 376 of the bail rests upon the multiplier racks 275, as shown in Fig. 4, but when these racks are released during the first cycle of operation, cam surfaces 381 on the upper edges of the multiplier racks 275 engage the cross bar 376 and swing the bail counterclockwise, thus depressing the link 262 and thereby moving the slide 254 downwardly from the position in which it is shown in Fig. 9.

Referring to Figs. 4 and 9, it will be noted that the extreme end portion 380 of the bail arm 378 normally lies beneath a long pin carriage restoring pawl 382 which is pivoted on a depending arm 384 forming part of the slide 64 (Fig. 12). The long pawl 382 rests upon the extremity 380 due to the force of gravity augmented by that of a tension spring 386. The righthand extremity of the long pawl 382 is normally positioned in alignment with a forwardly extending pin 388 on an arm 389 which is secured to a shaft 390. The shaft 390 is oscillated to swing its pin 388 counterclockwise from the pisition in which it is shown in Fig. 9 once during each operating cycle of the machine by a suitable drive from the main shaft.

This drive is illustrated as comprising an arm 390a secured to the rearward end of shaft 390. A generally spherical roller 390b (Figs. 9, 10, 15, 16, and 17) carried on the arm 390a is engageable with a cam 390c secured to the main shaft 200. A spring 390d (Fig. 9) provides the means for returning the arm 389 and its connected parts to the positions shown in the drawings, after the high point of cam 390c passes the roller 390b.

The bail comprising the cross bar 376 and arms 377 and 378 performs other functions which will appear hereinafter.

As best shown in Fig. 4, the multiplier racks 275, except the rack for the units order, have upwardly projecting limiting lugs 392, 393, 394, and 395, for the tens, hundreds, thousands, and ten thousands orders, respectively. These lugs are adapted to limit the downward swinging movement of the cross member 396 of a bail which includes portions 397 and 398 pivoted upon a shaft 400 (Figs. 2 and 8). This bail forms part of the total transfer mechanism, now to be described.

*Total transfer mechanism*

It will be recalled from the initial brief general description of the machine that after the multiples of the multiplicand have been accumulated upon the various accumulators, it is necessary, as for instance in the illustrative example of Fig. 14, during the tenth, eleventh, twelfth, and thirteenth cycles, to transfer the sub-products contained within the lower accumulators L2, L3, L4, and L5 to the uper accumulator U1. The mechanism for accomplishing this result includes a total transfer slide 402 (Figs. 2, 6, 7, and 8). This slide is mounted for rearward and forward sliding movement on fixed rods 379 and 405 which project through suitable elongated slots formed in the slide 402.

Also mounted upon the fixed rods 379 and 405 is a spring arm restoring slide 406 which is actuated by an arm 407 projecting upwardly from a bail 502 (to be described hereinafter), the bail being operated in a manner to move the slide 406 forward and backward once during each cycle of operation of the machine. The slide 406 is provided with a plurality of sidewardly extending studs 414, 415, 416, 417, and 418 (Figs. 7 and 8) which are connected by suitable tension springs 420 with anchoring studs formed on the spring arms 334 to 338, respectively. Thus, during each forward stroke of the restoring slide 406, the spring arm 334 is urged to swing clockwise, while the spring arms 335 to 338 are urged to swing counterclockwise on their respective pivots.

Each of the spring arms is provided with ears 424, 425, 426, 427, and 428, which cooperate with the total transfer slide 402 as follows: The total transfer slide is provided with an upwardly projecting portion having five equally spaced notches 434 formed therein to receive the ear 424 of the spring arm 334. Similarly, notches 435, 436, 437, and 438 are provided, respectively, for the ears 425 to 428, which latter form parts of the spring arms 335 to 338.

In general, the total transfer slide 402 has a normal position and four positions in which it is effective to control the transfer of sub-products from the lower accumulators to the upper accumulator. In each one of these effective positions of the total transfer slide 402, the ear 424 will be in alignment with one of the notches 434. In the normal position in which the parts are shown in Fig. 8, none of the ears 425 to 428 is in alignment with a notch 435 to 438. However, when the total transfer slide 402 is moved from normal to its first effective transfer position, the ear 425 will be in position for entering the notch 435. Similarly, during the second, third, and fourth effective positions of the total transfer slide 402, the ears 426, 427, and 428 will be in position for entering their notches 436, 437, and 438, respectively.

When any one of the ears 424 to 428 is thus in position for entering its notch 434 to 438, respectively, it will enter such notch upon the forward movement of the restoring slide 406, and in doing so, a portion of the particular spring arm 334 to 338 which is to be actuated will engage its associated pin 304 to 308, and thus operate its respective lever 314 to 318, and, through shifting of its selector 216 or 165 to 168, provide an actuating connection either between the lever 218 (Figs. 5 and 6) and the engagement controlling stud 154 of the upper accumulator, or provide such operative connection between the beam 175 and the stud 155 to 158 of one of the lower accumulators. Thus, the entry of one of the ears 424 to 428 in its associated notch results in the subsequent engagement of its associated accumulator with its segmental gear 92.

The number of total transfer operations to be effected is, of course, determined by the number of digits in the multiplier. For example, if the multiplier contains but one digit, no total transfer operations will be required, whereas, if it contains three digits, two total transfer operations will be required, i. e., transfers of the totals or sub-products from the lower accumulators L2 and L3 to the upper accumulator U1. Mechanism is provided to control the number of total transfer operations in response to the number of digits contained in the multiplier. This means is best shown in Figs. 2, 4, 5, 7, and 8, and includes the limit stop lugs 393 to 395 and the bail cross member 396, previously mentioned.

The bail arm 398 which is integral with the cross bail 396 has an arcuate rearwardly extending portion 440, which will hereinafter be termed the stepped selector. The stepped selector 440 has a plurality of stop faces 441 to 445, which are cooperable with a sidewardly extending ear 446, which may be formed integrally with the total transfer slide 402.

It will be noted that the spaces between the stop faces 442 and 445 are equal, while the space between the stop faces 441 and 442 is approximately one and one-half times as great as the space between the other stop faces. Furthermore, the stop face 441 is positioned so that if the stepped selector is swung so that this stop face is in position to be engaged by the ear 446, the total transfer slide 402 will be held substantially in its normal position, whereas, if any of the other stop faces 442 to 445 is positioned to be engaged by the ear 446, the total transfer slide 402 will be permitted to move rearwardly respectively one and one-half, two and one-half, three and one-half, or four and one-half times the distance between each adjacent stops 442 to 445.

Figure 7:
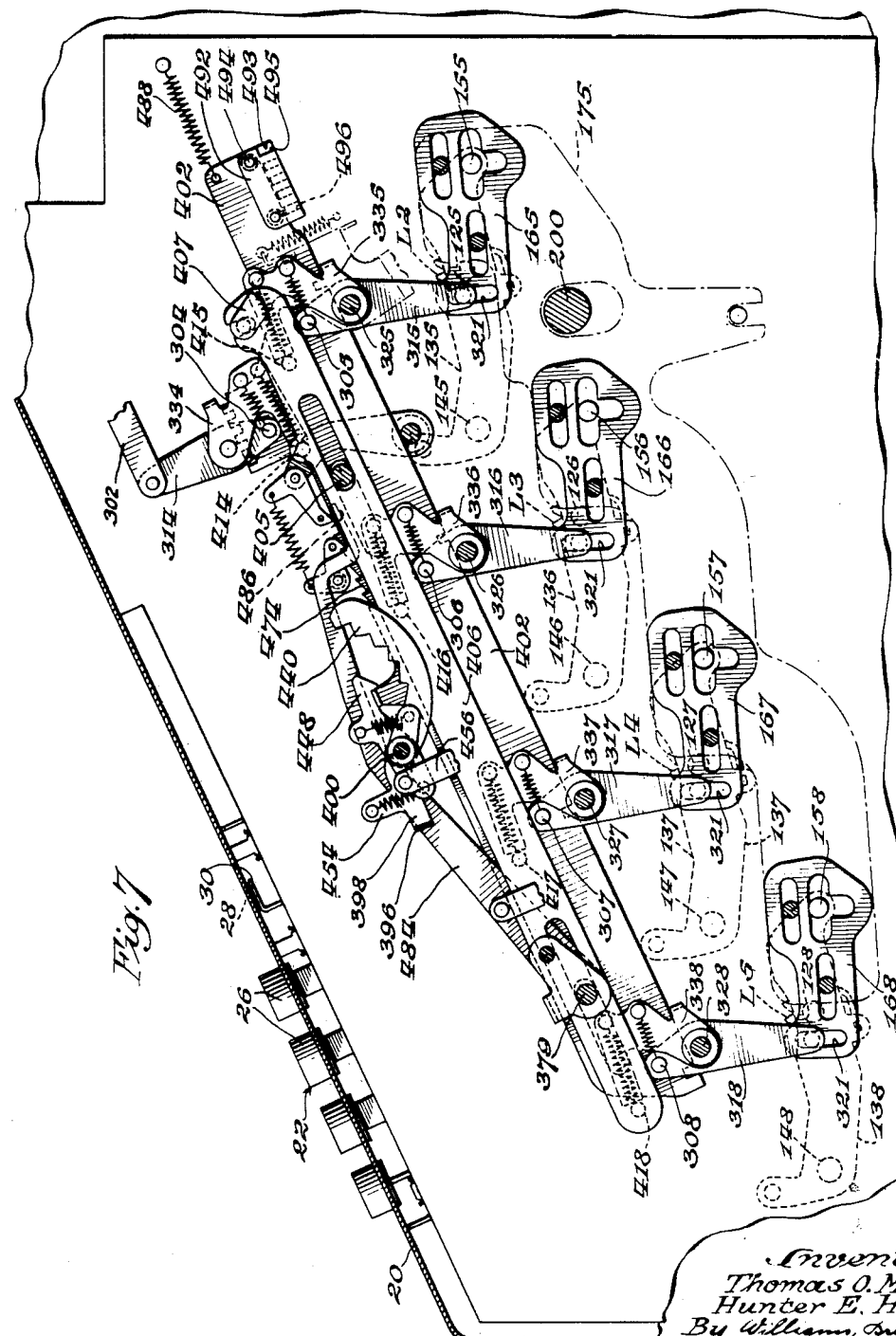

The total transfer slide 402 is normally held in its forward position, as shown in Figs. 7 and 8, by a latch 448 which is pivoted upon the rod 400. A two-armed lever 450 is pivoted on the rod 400 and has a stud 451 extending beneath the latch 448, this stud also serving as an anchorage for a tension spring 452 which resiliently maintains the latch 448 in engagement with the ear 446. The two-armed lever 450 has a forwardly extending portion which carries a stud 453 which extends beneath the arm 398 and is resiliently connected to said arm by a tension spring 454.

The upper end of an offset link 456 is pivotally connected to the forwardly extending arm of the lever 450, and at its lower end (Fig. 8), the link 456 is pivotally connected to the forward arm of a three-armed lever 458. The other arms of the lever 458 have sidewardly projecting studs 459 and 460. The three-armed lever 458 is adapted to be held in one of two positions of adjustment, as indicated in Fig. 8, being held in either of these positions by a spring-actuated detent 462 having notches 463 and 464 which receive a roller 464a rotatable on the stud 460. The studs 459 and 460 are adapted to be engaged by hooks 465 and 466, respectively, formed at the rearward end of an arm 468 which is pivoted upon a stud 469 riveted to a slide 470. The slide 470 is suitably mounted for longitudinal reciprocation, by a suitable driving connection from the main shaft 200, being reciprocated in a forward direction and then in a rearward direction once during each operating cycle by a cam 471 secured to the main shaft 200, the cam engaging a follower roller 470a carried by the offset rearwardly extending portion of the slide 470.

The position of the arm 468 and hence the determination of whether its hook 465 shall engage the stud 459 or its hook 466 shall engage the stud 460 is determined by the position of the cross member 376 of the bail which includes the arms 377 and 378, a link 472 serving as the connection between the bail cross member 376 and the arm 468. Thus, when any of the multiplier racks is released, its cam portion 381 raises the cross bar 376 and thus, through the link 472, raises the arm 468, so that upon the forward stroke of the slide 470, the hook 465 will engage the stud 459, swinging the three-armed lever 458 counterclockwise and pivoting the two-armed lever 450 counterclockwise, causing the stud 451 to engage beneath the latch 448 and move the latter to releasing position, at the same time moving the stud 453 away from beneath the bail arm 398, and thus permitting the stepped selector 440 to swing upwardly to an extent determined by the permitted downward movement of the cross member 396. It will be recalled that the downward movement of the cross member 396 is limited by the limiting lugs 392 to 395 so that the extent of upward swinging movement of the stepped selector 440 is determined by the number of digits in the multiplier.

As best shown in Figs. 18, 19, and 20, the total transfer slide 402 has a plurality of ratchet teeth 474 formed at its upper edge, these teeth being adapted to be engaged by a retaining pawl 476 and an actuating pawl 478, these pawls having sidewardly extending pins 477 and 479, respectively, and being resiliently urged toward ratchet engaging position by a tension spring 480 connecting the pawls.

Referring to Fig. 2, it will be noted that the arm 378 of the bail which includes the cross bar 376 has an arm 482 riveted thereto and that this arm is connected by a cross member 483 with an arm 484 which extends rearwardly and has an end portion 486 lying beneath the pins 477 and 479 of the pawls 476 and 478 (see also Figs. 7 and 8). Due to this kinematic train, the pawls 476 and 478 are raised from operative position whenever any of the multiplier racks 275 raises the bail cross bar 376.

The total transfer slide 402 has an actuating tension spring 488 attached thereto and suitably anchored to a frame plate. Thus, upon initial rearward movement of the multiplier racks 275, the pawls 476 and 478 are removed from the position in which they are effective to prevent rearward movement of the total transfer slide 402, and shortly thereafter, upon raising of the latch 448, also controlled by the movement of the cross bars 376, but actuated by the slide 470 through an arm 468 and three-armed lever 458, the total transfer slide 402 is free to move rearwardly under the influence of its actuating spring 488.

The extent of rearward movement of the total transfer slide 402 is determined by the position of the stepped selector 440 and, as previously described, the position of the latter is determined by the number of multiplier racks 275 which have moved from normal position and thus depends upon the number of digits in the multiplier.

As illustrated in Fig. 18, the stop faces 442 to 445 are positioned relative to the total transfer slide 402 in such manner that the transfer slide will move rearwardly a half step further than would be necessary to position one of its notches 434 to 438 in registry with one of the ears 424 to 428. This is to prevent any of the spring arms 334 to 338 from operating its accumulator selector during the adding cycles. The total transfer slide 402 remains in this position (Fig. 18) of a half step beyond its first effective control position throughout the necessary number of adding cycles.

The feed pawl 478 for returning the total transfer slide step-by-step toward its normal position is pivoted on an end of an actuating arm 490 which is pinned to a shaft 352. An arm 491 is also secured to the shaft 352 and carries a roller 491a cooperable with a plate cam 491b secured to the main shaft 200.

When all of the adding operations have been completed and the multiplying racks 275 have been restored to normal position, the cross bar 376 swings downwardly (Fig. 4) and thus lowers the arm 484, which has the projection 486 beneath the pins of the pawls 476 and 478, to the position shown in Fig. 8. These pawls thus are effective to engage the ratchet teeth 474 and, upon each operating cycle, the pawl 478 will oscillate through a stroke approximately one and one-half times that of the pitch of the ratchet teeth, and as a result, the total transfer slide 402 will be moved forwardly toward its normal position one-half step during the last adding cycle and then moved one full step during each total transfer cycle, as clearly indicated in Figs. 13, 18, 19, and 20. The retaining pawl 476 will, of course, hold the total transfer slide 402 in the position to which it is moved by the actuating pawl 478.

In addition, the lowering of the cross bar 376 results in lowering the link 472 and swinging the forked arm 468 clockwise to bring its hook 466 into position for cooperation with the pin 460. As a result of thus positioning the arm 468, during the cycle immediately following the cycle in which all of the multiplier racks 275 are returned to normal position, the three-armed lever 458 will be swung clockwise, raising the offset link 456 and swinging the lever 450 clockwise to lower the stepped selector 440 and return the latch 448 slightly lower than the position in which it is shown in Fig. 8, so that it is again in condition to latch over the ear 446 when the total transfer slide 402 has been returned to normal position.

As the total transfer slide 402 is progressively stepped toward its normal position by the actuating pawl 478, the spring arm receiving notches 438, 437, 436, and 435, respectively, will, (assuming that the machine is performing an operation involving a five-digit multiplier), be brought into position successively to receive the ears 428, 427, 426, and 425, respectively, of the spring arms. Likewise, as the total transfer slide 402 is successively stepped toward normal position, the ear 424 of spring arm 334 will successively enter the notches 434. As a result of the operation of the spring arm 334 in this manner, the upper accumulator U1 will be brought into mesh with the segmental gears 92 prior to the commencement of the return strokes of the actuating racks 75, and disengaged therefrom at the completion of the return strokes of these actuating racks.

During the successive total transfer cycles, the spring arms 338 to 335 will successively actuated because of the engagement of their ears 428, 427, 426, and 425 in their associated notches 438 to 435, and as a result, the accumulators L5, L4, L3, and L2 will, upon successive cycles, be brought into engagement with the actuating racks 75, prior to the commencement of the rearward stroke thereof, and the accumulators will be returned to zero position in the well known manner to limit the extent of rearward movement of the actuating racks 75. In this manner, the totals, or subproducts, which have been entered into the various lower accumulators are successively transferred and added into the upper accumulator U1 to obtain the grand total or product.

A pair of plates 492, 493 is secured by a pair of shouldered studs 494 to the rear end of the total transfer slide 402. The plate 492 has a single notch 495 formed therein, while the plate 493 has four notches 496 formed therein. These notches are adapted to be engaged, respectively, by the bent-over sensing end portions 497 and 498, respectively (Fig. 2), which form parts, respectively, of arms 499 and 500. These arms are pivoted upon the shaft 325 and have forwardly projecting extensions pivoted, respectively, to the upper ends of links 230 and 212, respectively (Figs. 6 and 4).

The arms 499 and 500 project through suitable slots formed in the cross member of a bail 502 and are resiliently maintained against the cross member of this bail by tension springs 503. The bail 502 has an offset downwardly extending actuating arm 504 (Fig. 8), which is swung counterclockwise from the position in which it is shown in Fig. 6 near the beginning of each cycle of operation and maintained in this position until near the end of the cycle of operation by a plate cam 505 secured to the main shaft 200, the arm being restored to the position shown in Fig. 6 by a tension spring 504a (Fig. 8).

It will be understood that as the bail 502 swings upwardly, the sensing end portions 497, 498 may engage, respectively, in the notch 495 or in one of the notches 496, and it is necessary that these end projections be removed from these notches prior to and during the time that the feed pawl 478 is operated to return the total transfer slide 402 an additional step in the forward direction. The arms 499 and 500, in swinging counterclockwise, respectively depress links 230 and 212 to condition the accumulator engaging selecting mechanisms for the desired character of operations to be performed. That is, the arm 499 is swung counterclockwise only after the total transfer slide 402 has been returned fully to normal position, since it is only under these conditions that the sensing portion 497 thereof will be in position to engage in the notch 495. Such counterclockwise swinging movement of the arm or lever 499 results in conditioning the total taking mechanism for the upper accumulator to take a total Similarly, counterclockwise swinging movement of the arm or lever 500, through depression of the link 212, causes the accumulator engaging mechanism for the lower accumulators to operate in a manner to clear these totalizers, and thereby permit the transfer of amounts registered thereon to the upper accumulator, as has been heretofore described.

The arm 499 has a sidewardly extending pin 506 (Fig. 6) which lies beneath the forwardly extending arm 508 of a bail 510 having a downwardly extending arm 512. The lower end of the arm 512 is pivotally connected to the link 514 which extends toward the forward end of the machine, being guided on a stud 516 and being normally pulled rearwardly by a tension spring 517. The forward extremity of the link 514 is in alignment with a sidewardly projecting pin 518 on the latch 370. Thus, when the total transfer slide 402 has been returned to its normal forward position, and hence permitted the sensing end portion 497 to engage in the notch 495, the bail 510 will be swung clockwise and the link 514 moved forwardly to move the latch 370 forwardly from engagement with the lug 372. As a result, the motor key stem 282 is drawn upwardly to its normal position by the spring 286.

Each of the stop pin carriages 54, 55 has the usual pivoted zero stop plate 54a, 55a to arrest the racks which, due to the positions of the pin carriages are not to be operated. During total transfer and grand total operations, the multiplicand racks 75 must be free to move rearwardly, and it is therefore necessary, during such operations, to raise the zero stop plate 54a from rack arresting position. The means for accomplishing this will now be described.

The arms 499 and 500 each has a forwardly projecting portion 499a, 500a (Figs. 6, 8, and 15) overlying a stud 520 projecting sidewardly from a rearwardly extending arm of a bell crank 522. The upwardly extending arm of bell crank 522 is connected by a link 524 with an arm 526 pinned to a shaft 528. The shaft 528 has a forwardly extending arm 520 secured thereto, the free end of this arm lying beneath the orward edge flange of the zero stop plate 54a. Thus, whenever either of the sensing arms 499 or 500 swings counterclockwise, the zero stop plate 54a will be raised to permit the multiplicand racks 75 to move rearwardly.

*Operation*

The general character of the operation of the machine as a whole has been previously described with reference to the example of multiplication shown in Fig. 14. The sequence of operations of the machine by which these calculating operations are performed may best be understood by reference to the timing chart Fig. 13. The operation of the machine will be described in the performance of the problem of multiplication as shown in Fig. 14.

Assuming that the operator has set up the multiplicand 95147 by successive depression on the proper keys of the multiplicand keyboard 22, and similarly, has set up the multiplier 36809 by proper sequential depression of the keys of the multiplier keyboard 24, the machine will be in condition for operation and will go through the necessary cycles of operation automatically, merely upon depression of the motor key 46.

The depression of the motor key 46 results in swinging lever 354 counterclockwise, causing its rearward end portion 360 to engage studs 362 and 364 (Fig. 4) and raise pawls 344 and 348 from engagement with the ratchet teeth 342, so that the multiplier racks 375 are released to travel rearwardly differential amounts, depending upon the multiplier amount set up in the pin carriage 55. As the multiplier racks are thus released and permitted to move rearwardly, they cam the cross bar 376 upwardly, and thereby swing the forwardly projecting portion 380 of the arm 378 downwardly to lower the link 262 and correspondingly depress the slide 254. Immediately after this has occurred, the shaft 268 is swung counterclockwise to cause its pin 269 to engage the projection 255 and, as previously described, shift all of the lower accumulators L2 to L5 to positions in which they are in normal registry with their segmental gears 92.

All of the multiplier racks 275 will move rearwardly with the exception of the "tens" rack, since the latter will immediately be arrested by the "0" stop pin of the pin carriage 55.

As all except the "tens" multiplier racks 275 move rearwardly, their lugs 294, 296, 297, and 298 (Fig. 5) move away from the studs 304, 306, 307, and 308, respectively, and springs 340 swing the lever 314 counterclockwise and swing the levers 316, 317, and 318 clockwise, to cause the selector 216 and the selector slides 166, 167, and 168 to move to a position so that the studs 154, 156, 157, and 158 are engaged in the horizontal portions of the T-shaped slots 214 and 160 of the selectors 216, 166, 167, and 168, respectively. This conditions all of the accumulators, except the accumulator L2, to be engaged with their respective segmental gears 92, upon operation of the accumulator engaging mechanisms.

The shifting of the accumulators to their normal registry position occurs at the beginning of the first cycle of operation, the motor being started by the closure of the switch 284 and thus driving the main shaft and through cam 268c operating the shaft 268, thereby effecting the shifting of the accumulators as described.

When the cross bar 376 is raised, due to the rearward movement of the multiplier racks 275, the link 472 is raised, and, through the forked arm 468 and the forward movement of the slide 470, swings the three-armed lever 458 counterclockwise to lower the offset link 456. Lowering of the link 456 results in swinging the lever 450 counterclockwise, thus swinging the stepped selector 440 counterclockwise to a position determined by the engagement of the bail cross member 396 against one of the limit stop lugs 392 to 395.

In performing the given problem of multiplication, this bail cross member 396 would not be permitted to move an appreciable extent because the limit stop lug 395 would have been moved directly beneath this cross member 396. Thus, the stop face 445 will be in alignment with the ear 446. Continued counterclockwise rotation of the two-armed lever 450 will cause its pin 451 to engage the latch 448, moving the latter to release the ear 446, whereupon, the total transfer slide 402 will be drawn rearwardly by its spring 488 until the ear 446 abuts against the stop face 445, it being understood that incidental to the upward movement of the cross bar 376, the arm 484, through its rearward end portion 486, will have raised the pawls 476 and 478 above the path of movement of the ratchet teeth 474.

Further, it will be understood that as the cross bar 376 is raised, due to the rearward movement of the multiplier racks 275, the forward extension 380 of its arm 378 (Figs. 9 and 10) will be lowered, thereby permitting the long pawl 382 to swing clockwise to remove its end from the path of swinging movement of the pin 388 on the end of the arm 389, thereby preventing the undesired return movement of the pin carriages to normal position.

After the total transfer slide 402 has been released and arrested by the engagement of its ear 446 with one of the stop faces (in the particular example, the stop face 445) of the stepped selector 440, the slide 406 will be moved forwardly and endeavor to swing the spring arms 334—338 in a direction to cause them to actuate their respective levers 314 to 318. Such swinging movement of the spring arms is, however, prevented due to the fact that the total transfer slide 402 has moved rearwardly a half step beyond that necessary to bring the notch 428 into alignment with the ear 428 and to bring the most forward of the notches 434 in alignment with the ear 424. As a result, the forward movement of the slide 406 does not have any effect upon the total transfer mechanism.

In a similar manner, the portions 497 and 498 of the sensing arms 499 and 500 do not enter either the notch 495 or one of the notches 496, respectively, and thus, the accumulator engaging mechanisms for both the upper and lower accumulators remain in the condition to cause adding operations, and similarly, the link 514 (Fig. 6) remains stationary so that the motor key stem 282 remains in latched position.

After the occurrence of the foregoing events, the restoring bail 78 for the multiplicand actuating racks 75 commences moving rearwardly, permitting the right-most five actuating racks 75 to move rerawardly until arrested by the sep stop pins of the pin carriage 54 representing the multiplicand number 95147. During the rearward movement of both the multiplicand racks 75 and the multiplier racks 275, the type wheels 106 of the printing mechanism 38 and 44 will have been differentially positioned through the segment gears 92 and idler pinions 110 so that these type wheels will be in position to print the multiplicand and multiplier. Having thus been positioned, the type arms 108 are released, by any suitable mechanism such as that partially illustrated in Figs. 3 and 5 and disclosed in greater detail in the copending application of Thomas O. Mehan, Serial No. 372,290, filed December 30, 1940, permitting the type to strike against the platen 42 and make a record of the multiplicand and multiplier.

As shown by the timing diagram Fig. 13, the next operation to take place after the type have fired is to cause the release of the feed pawl 348 and detent pawls 344 for engagement with the ratchet teeth 342 on the multiplier racks 275. It will be recalled that this release is effected by the rearward movement of the slide 374 (Figs. 6 and 16), causing the disengagement of the latch 356 from the lug 358 and permitting the arm 354 to swing clockwise, being moved by its actuating spring 354b, lowering its rearward end portion 360 from beneath the pins 362 and 364 (Fig. 4) on the detent pawl controlling bail 366 and on the feed pawl 348, respectively.

Following further the first cycle of operation of the machine, it will be noted from Fig. 13 that the next step in the operation is for the accumulator wheels to be put into operative engagement with the acuating racks 75 by being enmeshed with segmental gears 92. This operation is initiated by the pins carried by the plate cams 196 and 228, as previously described. Thereafter, the multiplier racks for the units, hundreds, thousands, and ten thousands orders are each restored forwardly one step by the operation of the feed pawl 348 engaging the ratchet teeth 342, the racks being held in such forwardly advanced position by the retaining pawls 344. The multiplier rack 275 for the tens order will, of course, be in the position in which the units rack 275 is shown in Fig. 5, so that the feed pawl will be ineffective to move it.

Following these operations, the restoring bar 78 is moved forwardly to restore all of the actuating racks 75 to normal home position. In doing so, the amount 95147 is added into each of the accumulators U1, L3, L4, and L5. Shortly before the completion of the first operating cycle of the machine, as indicated in Fig. 13, the accumulators U1, L3, L4, and L5 are disengaged from their segmental gears 92 (and hence from the actuating racks 75) by their accumulator engaging and disengaging mechanisms, the operation of which was previously described in detail.

During the second and third cycles of operation of the machine, it must perform exactly the same functions as during the first cycle, as will be seen from the example set forth in Fig. 14, except that it will usually not be desirable to print the sub-products, and means may therefore be provided to disable the printing mechanisms 38 and 44 after the first operation and to maintain these mechanisms disabled until just prior to the final total printing operation. These cycles may thus be identical with the first cycle previously described, except for the fact that it is not necessary to depress the motor bar, and the parts described as operated thereby will, during the second and third cycles, remain in the positions into which they were moved at the beginning of the first cycle, except for the following function which takes place near the end of the third cycle.

Since the ten thousands multiplier rack 275 was initially moved only three steps from its normal home position, representing the digit 3 in the ten thousands order of the multiplier, it will have been moved forwardly three steps to its fully restored or normal position near the end of the third cycle of operations. When thus moved to its normal position, its lug 298 engages the pin 308 and swings the lever 318 (Fig. 5) counter-clockwise to restore the selector 168 to its intermediate position. When this selector is in this position, upward and downward movement of the beam 175 does not cause engagement of the accumulator L5, since its actuating stud 158 rides freely in the vertical portion of the T-shaped slot in the selector 168, as well as in the vertical slot 202 formed in the beam 175.

It will be understood, however, that this shifting of the selector slide 168 occurs while the beam is in its elevated position, and that the beam is thus effective to disengage the accumulator L5 when the beam moves downwardly, but, as above described, is ineffective upon subsequent raising and lowering of the beam to cause engagement or disengagement of the accumulator L5. The remaining portion of the third cycle of operation is similar to the operation during the first cycle, as above described.

During the latter portion of the sixth operating cycle of the machine, the thousands multiplier rack 275 will have been fed forwardly to its fully restored position, and, in a manner similar to that described above with reference to the ten thousands multiplier rack toward the end of the third cycle of operation, will result in shifting the selector slide 167 to its intermediate position so that after the thousands accumulator L4 has been disengaged from its segmental gears 92 connected to the multiplicand racks, it will not be reengaged upon subsequent adding cycles.

Further, in a similar manner, toward the end of the eighth cycle of operation, the hundreds multiplier rack 275 will have been fully restored, with resultant movement of its selector slide 166 to its intermediate position, thereby preventing reengagement of its accumulator L3 upon subsequent adding cycles.

Finally, upon the final adding cycle, that is, the ninth cycle, all of the multiplier racks 275 will have been fully restored to home position, and all of the accumulator selectors 216, 165, 166, 167, and 168 restored to their intermediate positions.

When all of the multiplier racks 275 are restored to normal position, the cross bar 376 is moved downwardly by its spring, thereby accomplishing several functions. One of these functions is the lowering of the rearward end portion 486 of arm 484 (Fig. 8) from beneath the sidewardly extending studs 477 and 479 of retaining and actuating pawls 476, 478 for the total transfer slide 402 to permit these parts to move to the positions in which they are shown in Fig. 8. A further function of the lowering of the cross piece 376 is to raise the forward end portion 380 of the arm 378, thus raising the link 262 (Figs. 4, 5, and 9), and hence raising the slide 254 to the position in which it is shown in Fig. 9. The raising of the forward end portion 380 of the arm 378 also brings the end of the long pawl 382 in the path of movement of the stud 388 on the carriage restoring arm 389. Thus, toward the end of the ninth cycle, when the arm 389 swings counterclockwise (Fig. 9), its pin 388 will engage the end of the long pawl 382 and push the latter to the left and restore both of stop pin carriages 54 and 55 to normal position, such restoration resulting in camming the stop pins to normal position in the usual manner.

At the same time, the lowering of the cross bar 376 through the link 472 lowers the forked arm 468 (Fig. 8) so that its hook portion 466 will be in position for engagement by the stud 460 upon the following or tenth cycle of operation.

Just following the lowering of the pawls 476 and 478 into position for engagement with the ratchet teeth 474 (Fig. 8), the shaft 352 will be oscillated first counterclockwise and then clockwise by the cam 491b (Figs. 15 and 18) so as to advance and retract the feed pawl 478 through a distance slightly less than one and one-half times the pitch of the ratchet teeth 474, as indicated in Fig. 18. Due to the positions of the pawls 476 and 478 relative to the ratchet teeth 474, such movement of the pawl 478 will result in a forward movement of the total transfer slide 402 only one-half step to the position in which it is shown in Fig. 19. As will be noted from the timing chart Fig. 13, the total transfer slide is restored one-half step prior to the restoration of the stop pin carriages. As will be noted further from Fig. 13, the final operation during the ninth cycle is the disengagement of the accumulator wheels.

Thus, at the completion of the ninth cycle, the pinions of the upper accumulator will register the sub-product 856323, the pinions of the lower accumulator L2 will have remained in zero position, the pinions of the accumulator L3 will register the sub-product 761176, the pinions of the accumulator L4 will register the sub-product 570-882, and the pinions of the lower accumulator L5 will register the sub-product 285441. The machine is thus in condition to transfer the sub-products from the accumulators L3, L4, and L5 on the accumulator U1. As previously indicated, the transfer of these sub-products takes place during the tenth to thirteenth cycles of operation.

At the beginning of the tenth cycle, the lever 266 (Figs. 9 and 10) shifts counterclockwise, and thus its pin 264 engages the hook 256 and draws the link 246 to the right, from the position in which it is shown in Fig. 9 to the position in which it is shown in Fig. 10. As a result, the lower accumulators L2 to L5 will be shifted laterally different distances of one, two, three, and four steps, respectively. Thus, their arrangement with respect to the actuating racks 75 would correspond to the arrangement of the sub-products shown at the bottom and right of Fig. 14.

Also, during the initial portion of the tenth cycle, the slide 470 (Fig. 8) moves forwardly, and, through the forked arm 468, swings the three-armed lever 458 clockwise, and through raising the offset link 456, swings the two-armed lever 450 clockwise. The pin 453 on the two-armed lever 450 will engage beneath the forwardly extending arm 398 of the stepped selector 440 and swing the latter clockwise to its normal position, in which it is shown in Fig. 8. The stepped selector is thus positioned in its normal position, in which it remains during the remainder of the tenth, eleventh, twelfth, and fourteenth cycles of operation, in preparation for the performance of a second problem of multiplication by the machine.

Following the restoration of the stepped selector 440, the slide 406 is moved forwardly, tensioning the springs 420 and causing such of the spring arms 334 to 338 as have their ears 424 to 428 in alignment with the notches 434 to 438 to swing into such notches. In the particular example being performed, only the spring arm 334 and the spring arm 338 will thus have their ears 424 and 428 in alignment with the notches 434 and 438, and only these spring arms will be operated. Operation of these spring arms will result in moving the selector slide 168 and selector 216 to such positions that the accumulators L5 and U1 will be operatively connected to their respective accumulator engaging mechanisms.

In addition, the bail 502 (Fig. 8) will be swung counterclockwise by its cam 505, thus resiliently urging the sensing arms 499 and 500 to swing counterclockwise. The end portion 497 of the sensing arm 499 will not be in alignment with the notch 495, and thus will be incapable of movement. However, the sensing arm 500 will be in alignment with the left-most (Fig. 8) of the notches 496 in the plate 493, so that the arm 500 will swing counterclockwise and its forward extension will depress link 212 (Fig. 4) to condition the total-taking mechanism for the lower accumulators to effect the taking of totals therefrom.

Downward movement of the forward end 500a of the sensing arm 500 will raise the zero stop plate 54a of pin carriage 54 through operation of bell crank 522 and connecting linkage shown in Figs. 6 and 15.

Referring further to Fig. 13, the accumulator L5 is then engaged to be driven by the actuating racks 75, and shortly thereafter, these racks move rearwardly until limited by the zero stops on the pinions of the accumulator L5. Some time thereafter, as shown in the timing chart Fig. 13, the upper accumulator pinions are intermeshed with their segmental gears 92 and the pinions of the accumulator L5 are disengaged from their segmental gears 92 driven by the actuating racks 75. Thereafter, the slide 406 moves rearwardly under the control of cam 505 (Fig. 8), and through its stud 418, swings the spring arm 338 clockwise to remove its ear 428 from the notch 438, and, as a result, the lever 318 is swung clockwise to the position in which it is shown in Fig. 5, thereby restoring the selector slide 168 to its intermediate or neutral position. At the same time, the bail 502 (Fig. 6), in swinging clockwise, removes the sensing ear 498 of the arm 500 from the foremost notch 496.

Following these operations, the total transfer slide 402 is advanced one step forward by the feed pawl 478, in which position it is, of course, held by the retaining pawl 476. Toward the end of the tenth cycle, the upper accumulator pinions U1 are disengaged from their segmental gears 92, thus completing the tenth cycle, by transferring the amount 2854410000 to the upper accumulator U1 from the accumulator L5 which contained the amount 285441.

Shortly after the commencement of the elevent cycle, the ear 427 of the spring arm 337 is brought into engagement with its notch 437 by the forward movement of the slide 406, and, in a manner similar to that previously described, the sensing ear 498 is swung upwardly into the second notch 496 in the plate 493. Thereafter, the eleventh cycle continues in a manner identical with that described with reference to the tenth cycle except that the accumulator L4 is operated instead of the accumulator L5. As a result of the eleventh cycle of operation, the pinions of the accumulator L4 are restored to zero position, and the amount 570882000, which had been registered on accumulator L4 as 570882, is transferred and added into the upper accumulator U1.

The twelfth cycle of operation will be identical with the eleventh cycle of operation except that the accumulator L3 will be restored to zero position, and its registration 761176 will be added to the upper accumulator U1 as 76117600.

During the thirteenth cycle of operation, the parts will be operated in the same manner as previously described with reference to the eleventh and twelfth cycles except for the following: Since the pinions of accumulator L2 stood in their zero positions, the actuating racks 75 would not move rearwardly (except for the initial one-step transfer movement), and hence the upper accumulator wheels will not be actuated. As will be noted from the timing chart Fig. 13, the total-taking slide will have been fully restored toward the end of this thirteenth cycle where it becomes latched by the spring-pressed latch 448.

During the fourteenth cycle, the upper accumulator U1 is cleared, and the total therefrom printed, and the motor key is restored to prevent further operation of the machine. These effects are obtained as follows: Near the beginning of the fourteenth cycle, the ear 424 engages in the rearmost of the notches 434 so as to shift the selector 216 (Fig. 5) clockwise so as to provide an operative connection between the upper accumulator engaging mechanism and the accumulator frame. The sensing ear 497, upon the counterclockwise swinging movement of the bail 502 (Fig. 6), engages in the notch 495, and thus depresses the link 230 to condition the accumulator engaging mechanism for the upper accumulator for the taking of a total.

It will be understood that the engagement of the ear 424 with the rearmost notch 434 is effected by the forward movement of the slide 406. Since none of the ears 425 to 428 will be in registry with its associated slot, none of the spring arms 335 to 338 will be operated, and as a result, all of the selector slides 165 to 168 will remain in their intermediate positions.

As the sensing ear 497 enters the notch 495 in the plate 492, the pin 506, carried by the sensing arm 499, swings the bail 510 clockwise (Fig. 6), thereby moving the link 514 forwardly against the tension of its spring 517, and, due to the engagement of its forward extremity with the pin 518, swings the latch 370 from engagement with the lug 372, permitting the motor key stem 282 to move upwardly under the influence of its spring 286. The upward movement of the key stem 282 will, of course, permit switch contact arms 284 to separate, and thus deenergize the motor control circuit and mechanism. The motor control is so arranged that the motor will be continuously supplied with current until the cycle which has commenced has been completed.

Following these operations, the upper accumulator engaging mechanism (Fig. 6) will operate to swing the accumulator selector 216 downwardly, and thereby bring the upper accumulator pinions into meshing engagement with their respective segmental gears 92. After the upper accumulator pinions have thus been engaged, the restoring bail 78 (Fig. 3) will be moved rearwardly, permitting the actuating racks 75 to move rearwardly under the influence of their springs until arrested by the zero stops of the accumulator pinions 100 of the accumulator U1. The pinions of this accumulator will thus register the product 3502265923, and the type wheels 106 will, of course, be correspondingly positioned so that shortly thereafter, upon the firing of the type, this amount will be printed upon the record strip.

Following the printing of the product, the upper accumulator pinions are disengaged from their segmental gears 92 and the restoring bar 78 is operated to restore the actuating racks 75 to normal position. During the time that the actuating racks 75 are being returned to normal position, the slide 406 is moved rearwardly to disengage the ear 424 from the notch 434 and the ear 497 from the notch 495.

The machine will thus be in normal condition, ready for the performance of a second multiplying operation.

While we have shown and described a particular embodiment of our invention, it will be understood by those skilled in the art that numerous variations and modifications may be made in the construction of the machine without departing from the underlying principles of the invention. We therefore desire, by the following claims, to include within the scope of our invention all such variations and modifications by which substantially the results of our invention may be obtained by the use of substantially the same or equivalent means.

We claim:

1. In a multiplying machine, a plurality of multiplicand racks, amount set-up mechanism for said racks, means to move said racks differentially in accordance with the amount set up in said mechanism through a number of cycles equal to the largest digit in the multiplier, a plurality of differentially positionable multiplier control elements, there being one of said elements for each denominational order of the multiplier, an accumulator associated with each of said elements and cooperable with said multiplicand racks, means for differentially displacing said control elements a number of steps from normal position representative of the respective digits of the multiplier, means to return said elements toward their normal positions one step upon each cycle of operation of said multiplicand racks, and means mechanically operable by each of said control elements to cause its associated accumulator to engage said multiplicand racks during each cycle that the control element is displaced from normal position.

2. In a multiplying machine, the combination of a plurality of multiplicand racks, multiplicand set-up mechanism to limit the extent of actuation of said racks, a plurality of accumulators each comprising a plurality of wheels, means for actuating said racks repeatedly, means for engaging the accumulators with the racks to add the multiplicand into said acmumulators simultaneously, means to control the number of times that each of said accumulators is engaged with said racks, means to shift all except one of said accumulators laterally to cause the lowest order wheels thereof to be positioned for engagement with the ten's, hundred's, thousand's, etc., racks, respectively, and mechanical means to cause transfer successively by said racks of the amounts entered in said shifted accumulators into said unshifted accumulator while the former are in their shifted positions.

3. In a mutiplying machine, the combination of a plurality of multiplicand actuating racks, set-up mechanism for differentially controlling said racks, a plurality of sub-product accumulators engageable with said racks, multiplier control elements associated respectively with said accumulators to control the engagement of said accumulators with said racks during the number of cycles necessary to secure the additive entry of the sub-product in said accumulators through the process of repeated addition commencing simultaneously in all of said accumulators, a total transfer member, and mechanical means to render said total transfer member effective upon completion of the entry of the sub-product in said accumulators, and means to control the successive transfer to one of said accumulators of the sub-product entered in the remaining accumulators.

4. In a multiplying machine, having a plurality of differentially movable actuators, a plurality of accumulators engageable with said actuators, said accumulators being normally cyclically engageable with the same actuators, each of said accumulators comprising a plurality of wheels of lesser number than said actuators, means to shift said accumulators laterally differential distances, and means to restrain from movement such of said actuators as are not in alignment with the wheels of an accumulator when the latter is brought into engagement with said actuators.

5. In a multiplying machine, a plurality of differentially movable actuators, a plurality of accumulators normally columnarly aligned with each other and simultaneously engageable with a common group of said actuators, means for accumulating sub-products in said accumulators, means for laterally shifting said accumulators relative to one another to cause denominational alignment of the sub-products registered in said accumulators, and mechanical means including said actuators operative while said accumulators are in shifted position for effecting the transfer to one of said accumulators of the sub-products registered in the remaining accumulators, thereby to obtain a registration of the product.

6. In a calculating machine, a plurality of accumulators corresponding respectively to the denominational orders of the multiplier and normally in columnar alignment, means for simultaneously entering the multiplicand amount in said accumulators, each a number of times equal to the digit of the multiplier of corresponding denominational order, thereby to accumulate sub-products in said accumulators by a number of operations no greater than the largest digit of the multiplier, means for shifting the tens and higher order accumulators relative to the lowest order accumulator so that the units accumulator wheels of the former will respectively be in alignment with the correspondingly higher order accumulator wheels of the lowest order accumulator, and means for successively transferring the sub-products from the tens and higher order accumulators to said lowest order accumulator.

7. In a calculating machine, the combination of multiplier and multiplicand amount set-up mechanisms, groups of differentially movable actuators respectively controlled by said mechanisms, a plurality of accumulators cooperable with said multiplicand actuators, there being one accumulator for each denominational order of the multiplier, means under control of said multiplier actuators to cause their corresponding denominational order accumulators to have entered thereinto the multiplicand amount a number of times corresponding respectively to the differential positions of said multiplier actuators, thereby to cause said accumulators to register the sub-products, means operable upon completion of the accumulation of the sub-products to cause said accumulators to have their lowest order register wheels aligned with the particular multiplicand actuator corresponding to the denominational order of the accumulator, and means to successively effect the transfer by the multiplicand actuators of the tens and higher order sub-products to the units accumulator.

8. In a calculating machine, the combination of multiplier and multiplicand amount set-up mechanisms, groups of actuating members respectively controlled by said mechinasms, a plurality of accumulators, one for each denominational order of the multiplier, said accumulators being operable by said multiplicand actuating members to accumulate multiples of the multiplicand, means for operating said multiplicand actuating members a number of times equal to the largest digit of the multiplier, means controlled by said multiplier actuating members to cause engagement of their associated denominational order accumulators with said multiplicand actuating members a number of times equal to their corresponding multiplier digit, means operable upon completion of a number of cycles corresponding to the largest digit of the multiplier to shift all of said accumulators except the units accumulator relative to the multiplicand actuating members distances corresponding to their denominational orders, and means for successively transferring by the multiplicand actuating members the amounts entered in said accumulators other than the units order accumulator to the latter.

9. In a calculating machine, the combination of of a plurality of multiplicand accumulators corresponding to the denominational orders in the multiplier, means including actuators for entering the multiplicand into each of said accumulators the multiplicand a number of times equal to the multiplier digit of its corresponding denominational order, thereby to accumulate the sub-products in said accumulators, means to relatively shift said accumulators laterally distances necessary to position them in alignment as respects the denominational orders of the sub-products registered therein, and means including said actuators for successively transferring to the units order accumulator the accumulations appearing upon the tens and higher order accumulators.

10. In a multi-cycle calculating machine, the combination of a plurality of normally denominationally aligned multiplicand accumulators corresponding in number to the denominational orders in the multiplier, common actuators for said accumulators, means operable at the beginning of the first operating cycle to shift all of said accumulators into columnar alignment with said actuators, means including said actuators for entering into each of said accumulators the multiplicand a number of times equal to the multiplier digit of its corresponding denominational order, thereby to accumulate the sub-products in said accumulators respectively, means to shift said accumulators laterally relative to one another and relatively to said actuators different distances from their normal positions necessary to cause denominational alignment of the sub-products registered therein, and mechanical means for successively transferring to one of said accumulators the sub-products registered in the other accumulators.

11. In a calculating machine, the combination of multiplicand actuators, amount set-up mechanism for controlling the differential movement of the latter, multiplier control members, amount set-up mechanisms to differentially position the latter, a plurality of accumulators corresponding in number to the number of denominational orders of the multiplier, means for causing differential movement of said multiplicand actuators a number of times equal to the largest digit set-up in the multiplier amount set-up mechanism, means to simultaneously accumulate sub-products in said accumulators by causing engagement of said accumulators with said multiplicand actuators a number of times determined by the differential positions of said multiplier control members, means to relatively shift all of said accumulators except the lowest order accumulator laterally with respect to said multiplicand actuators to cause denominational alignment of the sub-products registered therein, and means including said multiplicand actuators for successively transferring the sub-products contained in the tens and higher order accumulators to the units order accumlator while said accumulators are in said shifted positions.

12. In a calculating machine, a plurality of accumulators, multiplicand actuators cooperable with said accumulators repeatedly to add the multiplicand in said accumulators, a plurality of multiplier members, means for differentially positioning said members in accordance with the multiplier amount, means for returning said multiplier members to normal position in a step-by-step manner, means controlled by said multiplier members to cause actuation of their corresponding accumulators upon successive adding operations as long as the associated multiplier member is displaced from normal position, means controlled by each of said multiplier members upon arriving at its normal position to render its associated accumulator ineffective to be actuated by said multiplicand actuators, whereby, upon operation of said multiplicand actuating mechanism through a number of cycles equal to the largest digit of the multiplier, all of the sub-products will be accumulated in said accumulators, and means to accumulate the sub-products registered by said accumulators.

13. In a multiplying machine, the combination of a plurality of multiplicand racks, multiplicand set-up mechanism to limit the extent of actuation of said racks, a plurality of accumulators each comprising a plurality of pinions engageable with said racks, means for actuating said racks repeatedly to add the multiplicand into said accumulators simultaneously, a multiplier set-up mechanism, means set thereby to control the number of times that each of said accumulators is engaged with said racks, means to shift all except one of said accumulators laterally to cause the units pinions thereof to be positioned for engagement with the ten's, hundred's, thousand's, etc., racks, respectively, and means including said multiplicand racks to transfer successively the amounts entered in said shifted accumulators into said unshifted accumulator while the former are in their shifted positions.

14. In a multiplying machine, having a plurality of differentially movable actuator racks, a plurality of accumulators simultaneously engageable with said actuator racks, each of said accumulators comprising a plurality of pinions of lesser number than said actuator racks, means to shift said accumulators laterally different extents, and means carried by said accumulators to restrain from movement such of said racks as are not in alignment with the pinions of an accumulator when the latter is brought into engagement with said actuators.

15. In a multiplying machine having a plurality of sub-product accumulators and a final product accumulator, elements differentially moved to represent the multiplier, and means including actuators operating in repeated cycles to cause entry of sub-products in said accumulators under the control of said elements, the combination of means to shift the sub-product accumulators laterally differential distances to cause denominational alignment thereof with respect to their actuators and with respect to the final product accumulator, a total transfer member, means to position said member differentially in accordance with the denominational magnitude of the multiplier, and means controlled by said total transfer member to cause the transfer to the final product accumulator of the sub-products entered in the sub-product accumulators.

16. In a multiplying machine for performing problems of multiplication by a method including operations of repeated addition carried on simultaneously in a plurality of accumulators, the combination of a multiplicand keyboard and a first stop mechanism controlled thereby, a multiplier keyboard and a second stop mechanism controlled thereby, multiplicand actuators cooperable with said stop mechanism and reciprocated during each adding cycle differential distances corresponding to the setting in said multiplicand keyboard, a plurality of accumulators engageable with said actuators, each of said accumulators corresponding to a denominational order of the multiplier, multiplier control elements differentially positioned by said second stop mechanism numbers of steps corresponding respectively to the digits entered in said multiplier keyboard, means operated by said multiplier control elements to cause engagement of said accumulators with said actuators to effect addition of the multiplicand therein numbers of times equal to the digit of the corresponding denominational order of the multiplier, means to initiate total transfer operations upon completion of the adding operations, said last named means including means for shifting said accumulators laterally different distances to effect denominational alignment with said multiplicand actuators of the sub-products registered therein, and a total transfer mechanism for effecting successive transfer to one of said accumulators of the sub-products contained in the other accumulators.

17. In a multiplying machine for performing problems of multiplication by a method including operations of repeated addition carried on simultaneously in a plurality of accumulators, the combination of a multiplicand keyboard and a first stop mechanism controlled thereby, a multiplier keyboard and a second stop mechanism controlled thereby, multiplicand actuators cooperable with said first stop mechanism and oscillated during each adding cycle differential distances corresponding to the setting in said multiplicand keyboard, a plurality of accumulators engageable with said actuators, each of said accumulators corresponding to a denominational order of the multiplier, multiplier control elements differentially positionable by said second stop mechanism numbers of steps corresponding respectively to the digits entered in said multiplier keyboard, means operated by said control elements to cause engagement of said accumulators with said actuators to effect addition of the multiplicand therein numbers of times equal to the digit of the corresponding denominational order of the multiplier set up in said multiplier keyboard, means to initiate total transfer operations upon completion of the adding operations, said last named means including means for shifting all except one of said accumulators laterally different distances to effect denominational alignment of the sub-products registered therein with said multiplicand actuators, and a total transfer mechanism for effecting successive transfer of the sub-products contained in the other accumulators to one of said accumulators serving as a master accumulator.

18. In a multiplying machine, sub-product accumulators each comprising a plurality of pinions, actuator racks common to all of said accumulators and engageable with said pinions to register sub-products therein, means to shift all except one of said accumulators laterally different distances relative to said actuator racks to effect denominational alignment of the sub-products registered therein, and means including said actuator racks for successively transferring the sub-products from said shifted accumulators to said unshifted accumulator.

19. In an electrically powered mechanical multiplying machine, the combination of a multiplier set-up means, multiplicand set-up means, a plurality of accumulators one associated with each denominational order of the multiplier, means including actuators contemporaneously operated under the control of said multiplier and multiplicand set-up means to enter additively the multiplicand into each of said accumulators a number of times equal to the digit in its associated denominational order of the multiplier, thereby to secure registration of the sub-products in said accumulators, means to differentially shift said accumulators laterally relative to said actuators to bring the accumulators into denominational alignment with one another, and means operating through a plurality of machine cycles to transfer to one of said accumulators the sub-products from the remaining accumulators, said last named means comprising means to move one of said accumulators into engagement with said actuators during each transfer cycle and successively moving each of said remaining accumulators into engagement with said actuators during such transfer cycles.

20. In a multiplying machine, the combination of a plurality of accumulators, means to enter sub-products therein by repetitive and contemporaneous addition of the multiplicand, a multiplier set-up mechanism, control elements positioned by said set-up mechanism, means to shift said accumulators to cause denominational registration of the sub-products therein with respect to said entering means, a transfer control member, means to move said member differentially from its normal position in response to the denominational magnitude of the multiplier entered in said multiplier set-up mechanism, means controlled by said transfer control member to cause successive transfer to one of said accumulators of the sub-products entered in the other accumulators, means to restore said transfer control member one step toward normal position upon each transfer operation, and means to stop the machine upon completion of the cycle during which said transfer control member has been returned to its normal position.

THOMAS O. MEHAN.
HUNTER E. HOOE.

CERTIFICATE OF CORRECTION.

Patent No. 2,379,449. July 3, 1945.

THOMAS O. MEHAN, ET AL.

It is hereby certified that error appears in the printed specification of the above numbered patent requiring correction as follows: Page 4, second column, line 49, for "beams" read --beam--; page 9, first column, line 66, after "will" insert --be--; page 10, first column, line 21, for "arm 520" read --arm 530--; line 53, for "racks 375" read --racks 275--; and second column, line 69, for "notch 428" read --notch 438--; page 11, first column, line 13, for "sep" read --set--; page 13, first column, line 3-4, for "elevent" read --eleventh--; and second column, line 74, claim 2, for "acmumulators" read --accumulators--; page 15, second column, line 42, claim 16, after "said" insert --first--; and that the said Letters Patent should be read with this correction therein that the same may conform to the record of the case in the Patent Office.

Signed and sealed this 13th day of November, A. D. 1945.

Leslie Frazer (Seal)                  First Assistant Commissioner of Patents.